United States Patent
Passaglia et al.

(10) Patent No.: US 11,765,164 B2
(45) Date of Patent: Sep. 19, 2023

(54) SERVER-BASED SETUP FOR CONNECTING A DEVICE TO A LOCAL AREA NETWORK

(71) Applicant: Amazon Technologies, Inc., Seattle, WA (US)

(72) Inventors: Abraham Martin Passaglia, Seattle, WA (US); Andrew Roths, Kenmore, WA (US); Paul Joseph Ellis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 485 days.

(21) Appl. No.: 16/285,934

(22) Filed: Feb. 26, 2019

(65) Prior Publication Data

US 2020/0274868 A1    Aug. 27, 2020

(51) Int. Cl.
*H04L 9/40* (2022.01)
*G06K 7/14* (2006.01)
*H04W 12/0471* (2021.01)

(52) U.S. Cl.
CPC ........ *H04L 63/0876* (2013.01); *G06K 7/1413* (2013.01); *H04L 63/083* (2013.01); *H04L 63/0823* (2013.01); *H04L 63/0853* (2013.01); *H04L 63/166* (2013.01); *H04W 12/0471* (2021.01)

(58) Field of Classification Search
CPC ............. H04L 63/0876; H04L 63/0823; H04L 63/083; H04L 63/0853; H04L 63/166; H04W 12/0471; G06K 7/1413
See application file for complete search history.

(56) References Cited

U.S. PATENT DOCUMENTS

| 9,172,699 | B1 * | 10/2015 | Vazquez | H04L 63/0823 |
| 10,498,598 | B1 * | 12/2019 | Sanchez | H04L 41/0846 |
| 10,652,030 | B1 * | 5/2020 | Levy | H04L 9/3268 |
| 10,701,067 | B1 * | 6/2020 | Ziraknejad | H04W 12/63 |

(Continued)

FOREIGN PATENT DOCUMENTS

WO     2017120243     7/2017

OTHER PUBLICATIONS

PCT/US2020/019326, "International Search Report and Written Opinion", dated May 29, 2020, 15 pages.

(Continued)

*Primary Examiner* — Catherine Thiaw
(74) *Attorney, Agent, or Firm* — Kilpatrick Townsend & Stockton LLP

(57) ABSTRACT

Techniques for providing a credential of a secure data network to a computing device are described. In an example, a system stores an association between the computing device and a user account. The user account is also associated with a credential of the secure data network. The system receives a certificate of the computing device and determines the association between the computing device and the user account based on the certificate. Further, the system authenticates the computing device based on the association being determined to send to the computing device data, where this data is verified based on a private key of the system. The system receives a request of the computing device for the credential based on the data and sends the credential to the computing device.

20 Claims, 12 Drawing Sheets

(56) References Cited

U.S. PATENT DOCUMENTS

| | | | |
|---|---|---|---|
| 2002/0023217 A1* | 2/2002 | Wheeler | G06Q 20/40975 |
| | | | 713/171 |
| 2006/0047949 A1* | 3/2006 | Brown | H04L 9/3265 |
| | | | 713/156 |
| 2009/0187983 A1 | 7/2009 | Zerfos et al. | |
| 2010/0077216 A1* | 3/2010 | Kramer | H04L 9/3234 |
| | | | 713/172 |
| 2012/0130902 A1* | 5/2012 | Dingler | G06Q 20/3829 |
| | | | 705/71 |
| 2012/0149334 A1* | 6/2012 | Zhang | H04W 12/068 |
| | | | 455/411 |
| 2012/0284785 A1* | 11/2012 | Salkintzis | H04W 12/068 |
| | | | 726/7 |
| 2014/0073288 A1 | 3/2014 | Velasco | |
| 2014/0215583 A1* | 7/2014 | Ding | H04W 12/06 |
| | | | 726/5 |
| 2016/0006739 A1* | 1/2016 | Huang | H04L 63/101 |
| | | | 726/5 |
| 2016/0029419 A1* | 1/2016 | Li | H04W 12/50 |
| | | | 370/329 |
| 2017/0288867 A1* | 10/2017 | Collier | G06F 21/31 |
| 2018/0206117 A1* | 7/2018 | Stahl | H04L 63/0823 |
| 2020/0154272 A1* | 5/2020 | Uy | H04L 9/3263 |
| 2020/0205207 A1* | 6/2020 | Harrington | H04W 12/06 |

OTHER PUBLICATIONS

GB Patent Application No. GB2111859.1, "First Examination Report," dated Jul. 19, 2022, 4 pages.
GB Patent Application No. GB2111859.1, "Office Action", dated Nov. 9, 2022, 2 pages.

* cited by examiner

SERVER-BASED SETUP FOR CONNECTING A DEVICE TO A LOCAL AREA NETWORK

BACKGROUND

Most computing devices, such as consumer electronics, support wireless connectivity. Typically, a computing device connects to a wireless access point that provides access to a data network. In many cases, the data network is a secure home network and is accessible to the computing device based on a credential, such as a passphrase. In such cases, different techniques are available to create a secure wireless home network. For example, Wi-Fi Protected Setup (WPS) is a network security standard that allows a user to connect the computing device to the secure wireless home network via the wireless access point. The WPS technique and other connection techniques generally rely on user input at the computing device and/or the wireless access point to establish the connection.

BRIEF DESCRIPTION OF THE DRAWINGS

Various embodiments in accordance with the present disclosure will be described with reference to the drawings, in which.

DETAILED DESCRIPTION

Figure 1:
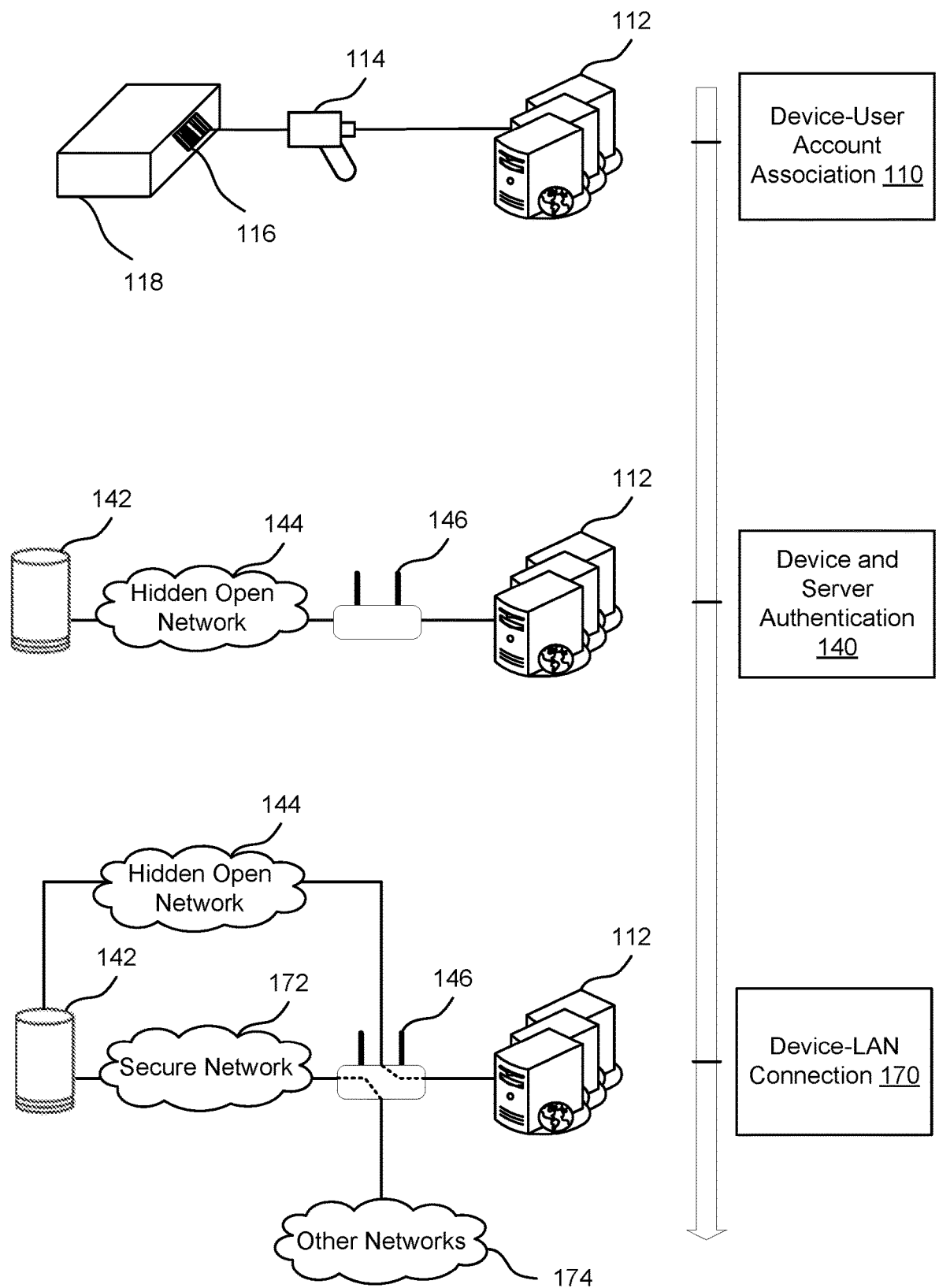
FIG. 1 illustrates an example of connecting a computing device to a secure data network, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a server-based setup process for automatically connecting a computing device to a secure data network, such as a secure local area network (LAN). The server-based setup allows a wireless connection to be established in a secure manner and without user input at the computing device and/or another device of the secure data network during the setup process. In an example, the computing device establishes a data connection with a provisioner computing device, such as a wireless access point, over a different data network. This provisioner computing device can manage data communications between the computing device and a backend system, such as a cloud server. In particular, outbound data traffic from the computing device is received by the provisioner computing device over the different data network and sent to the backend system. Inbound data traffic to the computing device is received by the provisioner computing device from the backend system and transmitted to the computing device over the different data network. The data communications involve an exchange of certificates between the computing device and the backend server for mutual authentication. In addition, the backend system further authenticates the computing device based on an existing association between the computing device and a user account. Similarly, the computing device further authenticates the backend system based on a digital signature, where this digital signature is received as part of the data communication. This further layer of authentication adds security to the setup process by helping to prevent against man-in-the-middle type of network attacks. Once authentication is complete, the computing device can request from the backend system, via the provisioner computing device, a credential of the secure data network. Upon determining that an identifier of the secure data network and its credential are associated with the user account, the backend system sends the credential to the computing device, via the provisioner computing device. In turn, the computing device establishes a data connection with an access point of the secure data network by using the credential, thereby connecting to the secure data network.

To illustrate, consider an example of a secure home network that includes a router and a first voice-controlled multimedia device (VCMD) of a user. A second VCMD is to be connected to this network. In this example, both VCMDs are registered under a user account with a service provider, where this user account is maintained on a cloud server. When the first VCMD was connected to the secure home network for the first time, the service set identifier (SSID) and the passphrase for the connection were stored under the user account. When the second VCMD was registered under the user account, the registration included storing at least a portion of the second VCMD's public key under the user account. In addition, the router provides access to a hidden open network having a predefined SSID, where data traffic over this network can be limited based on a set of restrictions.

Upon powering on for the first time, or optionally upon a detection that a data connection to a home network has not been set-up, the second VCMD enters a Wi-Fi setup mode. In this mode, the second VCMD determines the predefined SSID, its digital certificate, and a network address of the cloud server from its local memory and automatically connects to the router over the hidden open network. The second VCMD also sends its digital certificate in a hypertext transfer protocol secure (HTTPS) request addressed to the cloud server. The router receives this request and, based on the restrictions allowing outbound traffic to the cloud server, forwards it to the cloud server. The router receives back a digital certificate of the cloud server in an HTTPS response addressed to the second VCMD and, based on the restrictions allowing inbound traffic to the second VCMD from the cloud server, forwards the HTTPS response to the second VCMD. Given the two digital certificates, the second VCMD and the cloud server perform a mutual transport layer security (TLS) authentication.

Next, the cloud server determines that the public key of the second VCMD from the received digital signature matches at least the portion of the public key stored under the user account. Accordingly, the cloud server further authenticates the second VCMD based on this match and generates a digital signature by encrypting data with a private key of the cloud server. The private key may be one of multiple private keys of the cloud server and is specifically usable for the type of the second VCMD. This digital signature is sent to the second VCMD via the router. In response, the second VCMD accesses a public key corresponding to the private key, where this public key and other public keys of the cloud server are stored in the local memory of the second VCMD. The second VCMD verifies the digital signature by using the public key of the cloud server. Upon a successful verification, the second VCMD further authenticates the cloud server.

Once the authentication is complete, the second VCMD sends another HTTPS request addressed to the cloud server via the router. This request includes the SSID of the secure home network, is received by the router over the hidden open network, and is forwarded to the cloud server based on the restrictions allowing so. In response, the cloud server determines the passphrase for the secure home network from the user account and sends this credential in an HTTPS response addressed to the second VCMD. The second VCMD receives this HTTPS request given that the restrictions allow this inbound traffic. Accordingly, the second VCMD disconnects from the router over the hidden open network and establishes a new data connection with the router over the secure home network by using the passphrase.

The server-based setup process for automatically connecting a computing device to a secure data network provides many technical improvements over conventional techniques for setting up a data connection. For example, this setup process may be performed automatically without involving user input. In particular, once the computing device is registered under a user account associated with a credential of the secure data network, the user may merely need to power on the computing device for this device to communicate with the backend system and connect to the secure data network. In addition, this setup may be performed securely by relying on multiple layers of authentication, including a layer that reduces the risk of or prevents man-in-the-middle attacks. Furthermore, by restricting inbound and outbound traffic to and from the computing device when the different data network is utilized for the authentication and the receipt of the credential, other devices on the secure data network can be protected. The use of multiple private keys and corresponding public keys of the backend system also allows for limiting the impact of a private key being compromised and can support key rotation. These and other technical improvements are further described and apparent from the description of the figures herein below.

By using the server-based setup process, a user can obtain a computing device registered under a user account with the backend system. Upon powering on and not having the credentials of the user's secure home Wi-Fi network, the computing device connects to a nearby open Wi-Fi network and uses this network to communicate with the backend system that stores the credentials. The backend system identifies the computing device and the user account. Upon mutual authentication, the backend system sends the credentials to the computing device. In turn, the computing device disconnects from the open Wi-Fi network and connects to the secure home Wi-Fi network.

FIG. 1 illustrates an example of connecting a computing device to a secure data network, according to an embodiment of the present disclosure. Generally, the computing device is first associated with a user account, then connects to a server over a different network for authentication, and, once authenticated, receives a credential from the server to connect to the secure data network. FIG. 1 shows this approach in multiple stages.

As illustrated, at an initial stage, a device-to-user account association 110 is generated. The device-to-user account association 110 supports a subsequent cloud-based setup of the connection in a secure manner. In turn, the cloud-based setup can involve multiple stages including one for a device and server authentication 140 and one for a device-to-LAN connection 170. The device and server authentication 140 relies on the device-to-user account association 110 to ensure that the device is authenticated to the server and to complete the authentication of the server to the device. The device-to-LAN connection 170 occurs once authentication is complete and involves a data exchange about a secure LAN such that the device can connect to the secure LAN. At each of these stages, different computing components are involved as further described herein next.

At the initial stage, a server 112 receives data about a computing device 142 from a remote device 114. This data generally identifies the computing device 142 and includes information unique to the computing device 142 and usable for authentication, such as a public key of the computing device 142 or a portion of this public key. The data can also identify a user account of a user that obtained (e.g., purchased) the computing device 142. The user account can store credentials of a secure network 172. Generally, a credential of the secure network 172, such as a passphrase, from a computing device is needed before the computing device can join the secure network 172, where this credential is part of protected access to the secure network 172 at the communications link. In an example, the secure network 172 represents a secure home network for different computing devices of the user. In an illustrative example, upon a purchase of the computing device 142 under the user account, the data can be generated and stored (e.g., encoded) in a label 116 (e.g., a barcode) attached to a container 118 (e.g., a box) storing the computing device 142 (or attached directly to the computing device 142). As part of providing the computing device 142 to the user, the remote device 114 is used to scan the label 116, and read and send the data to the server 112. In response, the server 112 generates and stores the device-to-user account association 110. For instance, the server 112 updates the user account to store some or all of the received data, including the device identifier, the type of the computing device 142, and the public key or portion thereof. Also at this stage, a public key of the server 112 is loaded onto the computing device 142 (e.g., as a part of manufacturing or providing the computing device 142). Further details about the computing components and the interactions between them in this initial stage are further described in relation to FIG. 2.

At the next stage, the user receives the computing device 142 (e.g., receives the container 118 and unpacks the computing device 142 therefrom). The user then powers on the computing device 142. If the computing device 142 determines that it has not been connected yet to a home network (e.g., the first time the device is powered on), the computing device 142 determines an SSID of a hidden open network 144 from its local memory. The computing device 142 then establishes a data connection with a wireless router 146 of the open hidden network 144, thereby joining this hidden open network 144. The wireless router 146 is already communicatively coupled with the server 112 and can send, to the server 112, data received from the computing device 142 over the data connection, and can send, to the computing device 142 over the data connection, data received from the server 112. In an example, the wireless router 146 may apply restrictions to the inbound and outbound data traffic to and from the computing device 142 to ensure that the data connection with the computing device 142 is used properly and securely.

The data exchange between the computing device 142 and the server 112 via the wireless router 146 includes the computing device 142 sending its device digital certificate to the server 112 and the server 112 sending its server digital certificate to the computing device 142 for mutual authentication. In addition, the server 112 can retrieve the public key of the computing device 142 from the device digital certificate and compare and match this key to the data about the computing device 142 under the user account. If a match exists, the server 112 determines that the computing device 142 is authenticated and generates a digital signature by encrypting data with its private key. The digital signature is sent to the computing device 142 and, in response, the computing device 142 verifies the digital signature with the public key of server 112, where this key is available from the local memory of the computing device 142. Upon verification, the computing device 142 determines that the server is also authenticated. Further details about the computing components and the interactions between them in this stage are further described in relation to FIG. 3.

Once the device and server authentication 140 is complete, the computing device 142 and the server 112 may continue exchanging data, while the computing device 142 is still on the hidden open network 144, to receive the credentials of the secure network 172. At that point, the computing device 142 disconnects from the hidden open network 144 and uses the credentials to connect to the secure network 172 via the wireless router 146, thereby joining the secure data network 172 (e.g., the home network of the user's computing devices). The restrictions on the inbound and outbound data traffic would no longer be applicable and the computing device 142 can interact with computing devices and access computing services on other data networks 174, in addition to the server 112.

In an illustrative example, the computing device 142 detects the SSID of the secure data network 172 and sends, via the data connection to the wireless router 146 on the hidden open network 144, a request to the server 112 for a passphrase corresponding to the SSID. In response, the server may determine that the SSID is associated with the user account (e.g., stored thereon), retrieves the passphrase (e.g., from the user account), and sends it back to the computing device 142 via the wireless router 146 and over the data connection on the hidden open network 144. Having received the credential, the computing device 142 terminates the data connection, and establishes a new data connection with the wireless router 146 by using the SSID and the passphrase, thereby joining the secure data network 172. Further details about the computing components and the interactions between them in this stage are further described in relation to FIG. 4.

In the interest of clarity of explanation, FIG. 1 describes multiple stages that involve particular computing components. However, embodiments of the present disclosure are not limited as such. For example, the server 112 may be a cloud-server and/or a computing component of a backend system that includes one or more servers. The functionalities of the server-based setup process can be distributed within the backend system. In another example, the computing device 142 need not connect to the same wireless router to join the hidden open network 144 and the secure data network 172. For instance, two different routers can be used, one on each of the two data networks. In another illustration, devices other than routers can be used. For instance, the computing device 142 can connect to an access point on the secure data network 172. Alternatively, another computing device of the user already registered under the user account that has already joined the secure data network 172 can be used as an access point to the hidden open network 144. Generally, such a computing device and the wireless router 146 described herein above are examples of a provisioner device with which the computing device 142 communicates to exchange data with the server 112 for authentication and receipt of the credential of the secure data network 172. In yet another example, a different type of network can be used instead of the hidden open network 144. For instance, this data network may simply be an open network (rather than being hidden) that broadcasts is SSID (in which case, the computing device 142 need not pre-store this SSID in its memory). In another illustration, the data network can be a public network with a captive portal. In this case, the data exchange with the server 112 can be performed by sending the relevant data over domain name service (DNS) requests. These and other variations are further illustrated in connection with the next figures.

Figure 2:
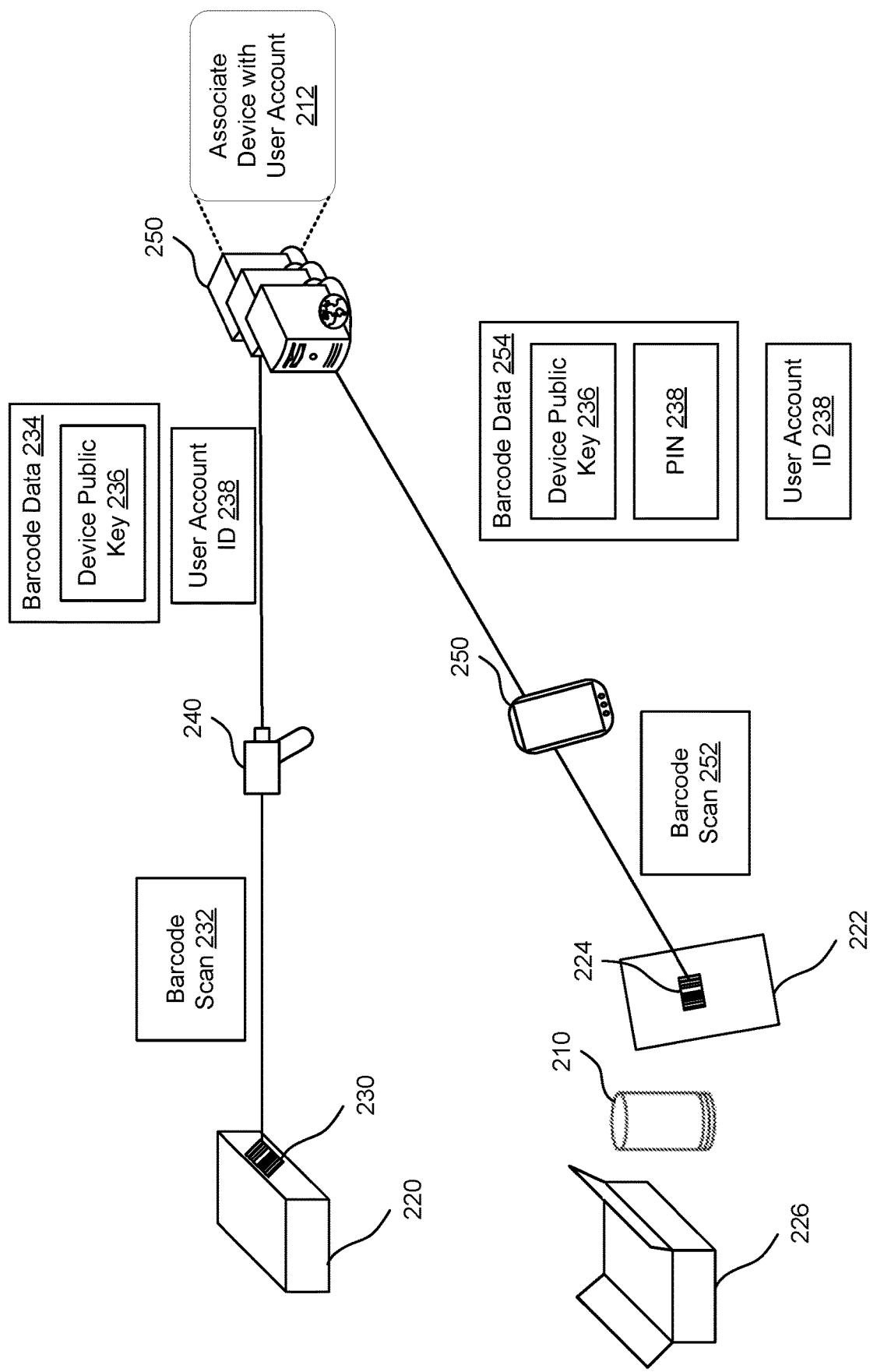
FIG. 2 illustrates examples of associating a computing device with a user, according to an embodiment of the present disclosure.

FIG. 2 illustrates examples of associating a computing device with a user, according to an embodiment of the present disclosure. The association of the computing device with the user may be performed to generate a device-to-user account association, similar to the device-to-user account association 110 of FIG. 1, that in turn is usable during a server-based setup of a connection of the computing device to a secure data network. FIG. 2 illustrates two examples for generating this association. In a first example, shown as starting in the top part of FIG. 2, a computing device is obtained (e.g., purchased) by a user from a service provider, where the user has a user account with the service provider. In this first example, the service provider can generate the association. In a second example, shown as starting in the bottom part of FIG. 2, the user obtains the computing device from a third party. In this example, the user (or the third party) can generate the association. Other examples for the generating the device-to-user account are also possible including, for instance, a conventional online registration of a computing device under the user account.

In the first example, a user orders a computing device 210 from the service provider (e.g., purchases it online from a web site of the service provider). The computing device 210 is an example of the computing device 142 of FIG. 1. Generally, the computing device 210 can be any suitable user device including one or more processors, one or more memories, and one or more interfaces for executing one or more applications, interacting with the user, interfacing with remote computing devices, and the like. For instance, the computing device 210 can be a VCMD representing a smart speaker providing an intelligent personal assistant service responsive to a wakeword and capable of different interactions including content playing, providing real-time information, and performing tasks and routines, smart plug, multimedia streaming device, or any other device hosting an intelligent personal assistant service, a power management service, a streaming service, and/or other applications. In other illustrations, the computing device 210 can be a mobile phone, a tablet, a desktop computer, a smart television, a digital video recorder, or any other user device having one or more processors, one or more memories, and one or more interfaces.

In a storage facility of the service provider, the computing device 210 can be added to a container 220 for delivery to the user. A barcode 230 can be attached to the container 220 (e.g., to an external surface of this container 220) and can encode data related to the computing device 210 (e.g., the product number, a public key or a portion thereof, and/or a type of the computing device 210, where the type can be a product category such as VCMD, a smart plug, etc.). Optionally, the barcode can also encode data about the user account of the user. A remote device 240, such as a scanner at the storage facility (e.g., a handheld scanner or a product scanner in a workstation of the storage facility), performs a barcode scan 232 to read the barcode data 234 (e.g., the data encoded in the barcode 230). The remote device 240 is communicatively coupled with a server 250 (or, more generally, backend system) of the service provider and sends the barcode data 234 to this server 250. In an illustration, the remote device 240 is on a same network with a central computer that manages purchase orders of users. The barcode data 234 is sent from the remote device 240 to this central computer and the central computer sends it to the server 250. The sent barcode data 234 includes, for instance, the public key of the computing device 210 (shown as device public key 236) or the portion of the device public key 236 that was encoded in the barcode 230. Other data can also be included such as the computing device's 210 product number (e.g., a serial number) and/or product category. The product category can represent a type of the computing device 210, such as whether the computing device 210 is a VCMD, smart plug, multimedia streaming device, etc. For clarity in the present disclosure, a product category of a computing device can be referred to as a type of the computing device. In addition, if the barcode 230 encoded data about the user account, the barcode data 234 can include an identifier 238 of the user account. Otherwise, the server 250 can receive the identifier 238 separately from the barcode data 234. For instance, another barcode attached to the container 220 and/or printed in a purchase order encodes the identifier 238. Upon a scan of this barcode, the remote device 240 reads and sends the identifier 238 from this barcode to the server 250. Additionally or alternatively, the identifier 238 can be sent from the central computer based on a user purchase of the computing device and based on this central computer receiving the barcode data 234 from the remote device 240.

In turn, the server 250 receives the barcode data 234 and the identifier 238 of the user account and associates 212 the computing device 210 with the user account. For instance, the server 250 looks up the user account based on the identifier 238 of the user account and adds to this account some or all of the barcode data 234 including, the device public key 236 (or the portion thereof), the product number, and/or the device type. Additionally or alternatively, the server 250 can update a list that associates device public keys with user account. Such a list is referred to herein as a public key-user account list. For instance, the device public key 236 (or portion thereof) can be added as a key, and the identifier 238 can be added as a value in the public key-user account list. Generally, the server 250 can be implemented as specialized server hardware, as server-based software running on general purpose hardware, and/or as a cloud-based computing service. The server 250 can be a computing component of the backend system of the service provider, where this backend system may store user accounts for different users and provide computing services (e.g., multimedia streaming) to computing devices of the users based on the user accounts. Although the embodiment illustrated in FIG. 2 is provided in relation to a barcode and a barcode scanner, other data entry methods and systems can be utilized, including radio frequency identifiers (RFIDs) or the like.

In the first example, rather than using a product scanner, the remote device can be a mobile device 250 of the user, such as a smartphone. The mobile device 250 can execute a mobile application (e.g., an "app") to communicate with the backend system of the service provider based on a user login on the mobile application to the user account. In this example, the user may receive a container that includes the computing device 210 and a sheet 222 (e.g., a paper, a brochure, a user manual, etc.). This sheet 222 includes barcode 224, similar to the barcode 230, encoding the above data. In addition, the barcode 224 can encode a personal identification number (PIN) 238 that can be used for further authenticating the computing device 210, as illustrated in connection with the next figures. The sheet 222 can, but need not, be attached to the computing device 210. Upon opening the container (shown as container 226 in an open state in FIG. 2), the user retrieves the computing device 210 and the sheet 222 and uses the mobile application to perform a barcode scan 252 of the barcode 224 (e.g., to capture an image of the barcode 224). In turn, the mobile application reads the encoded data and sends barcode data 254 to the server 250. The sent barcode data 254 includes, for instance, the device public key 236 (or the portion thereof) and the PIN 238. Other data can also be included such as the computing device's 210 product number and/or type. In addition, if the barcode 230 encoded data about the user account, the barcode data 234 can include the identifier 238 of the user account. Otherwise, this identifier 238 is determined based on the user login to the user account.

Here also, the server 250 receives the barcode data 254 and the identifier 238 of the user account and associates 212 the computing device 210 with the user account. For instance, the server 250 looks up the user account based on the identifier 238 and adds to this account some or all of the barcode data 254 including, the device public key 236 (or the portion thereof), the PIN 238, the product number, and/or the device type.

Figure 3:
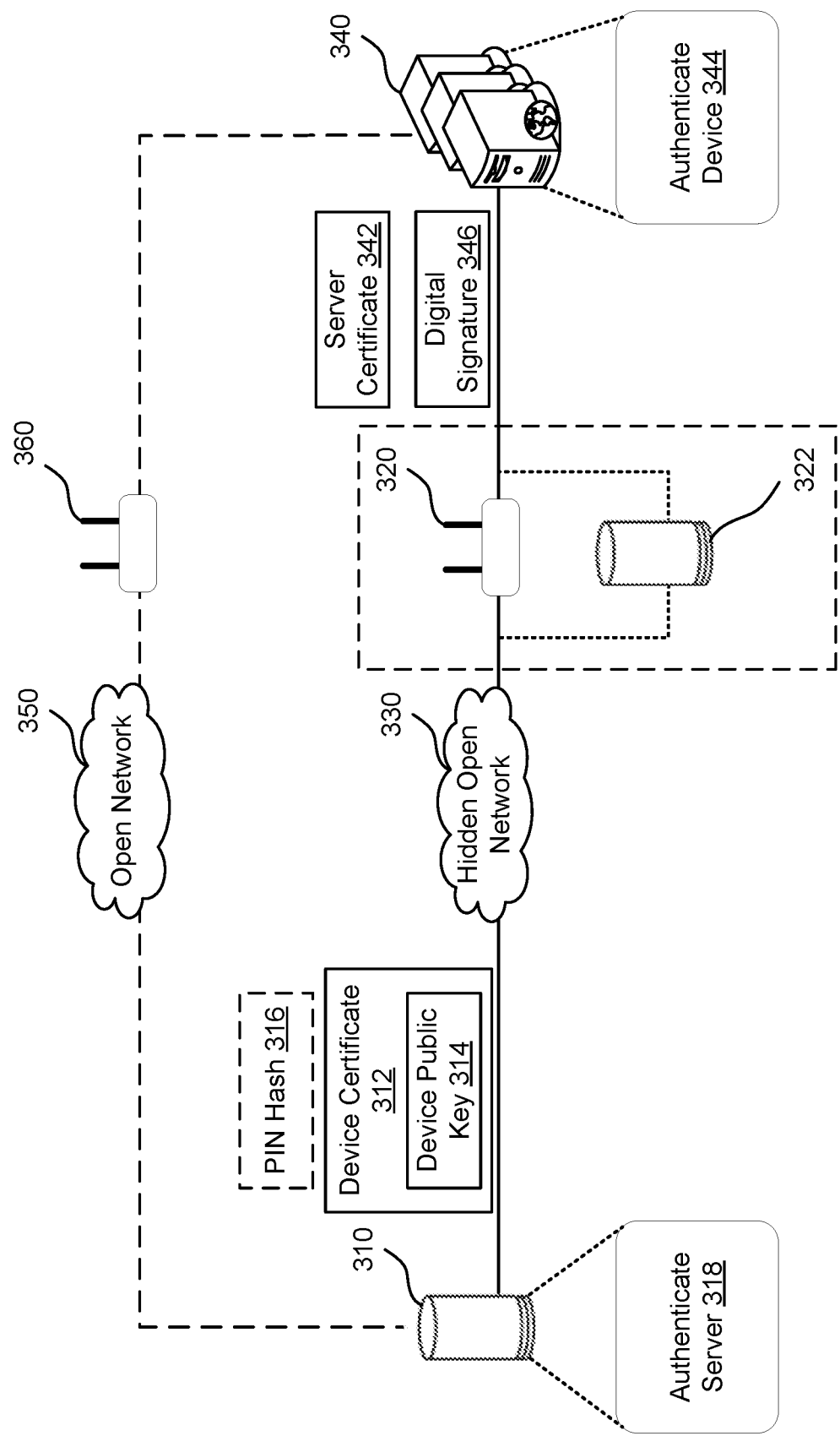
FIG. 3 illustrates an example of mutual device and server authentication, according to an embodiment of the present disclosure.

FIG. 3 illustrates an example of mutual device and server authentication, according to an embodiment of the present disclosure. As illustrated, a computing device 310 establishes a data connection with a wireless router 320 to join a hidden open network 330. Once on the hidden open network 330, the computing device 310 and a server 340 can exchange data via the wireless router 320 for authenticating 318 the server 340 to the computing device 310 and for authenticating 344 the computing device 310 to the server 340. The computing device 310, the wireless router 320, the hidden open network 330, and the server 340 are examples of the computing device 142, the wireless router 146, the hidden open network 144, and the server 112, respectively, of FIG. 1.

In an example, the wireless router 320 manages access of computing devices to the hidden open network 330 and to inbound and outbound traffic to and from such computing devices on the hidden open network 330. Generally, the hidden open network 330 has an SSID, but does not need a passphrase for access (and, thus, this data network is referred to as "open"). The wireless router 320 also does not advertise (e.g., broadcast) the SSID (and, thus, this data network is also referred to as "hidden"). The hidden open network 330 can support various data communications protocols, including Wi-Fi protocols and transmission control protocol and the Internet protocol (TCP/IP protocols).

A service provider of the server 340 can define the SSID (e.g., by calling the hidden open network 330 "SSID_example" or some other name) and restrictions about using the hidden open network 330. If the wireless router 320 is designed, manufactured, and/or provided by the service provider, the SSID and restrictions can be pre-stored in the memory of the wireless router 320. On the other hand, if the wireless router 320 is designed, manufactured, and/or provided by a third party, the service provider can store the SSID and the restrictions in a software development kit (SDK) or a configuration file for download to the wireless router 320. In both cases, once installed at a user location, in addition to managing access to a home data network, the wireless router 320 can manage, based on the restrictions, access to the hidden open network 330 having the SSID.

Similarly, and prior to providing the computing device 310 to a user, the SSID (and other application level restrictions) can be pre-stored in local memory of the computing device 310. In particular, if the computing device 310 is designed, manufactured, and/or provided by the service provider, the SSID can be pre-stored in the local memory of the computing device 310 during the manufacturing process or after manufacturing but prior to shipping. On the other hand, if the computing device 310 is designed, manufactured, and/or provided by a third party, the service provider can store the SSID in a software development kit (SDK) or a configuration file for download to the computing device 310.

In addition, the service provider can define a number "N" (e.g., ten) of public keys of the server 340 ("N" server public keys) that should be stored on the computing device 310 and can identify one of these public keys that should be used by the computing device 340 for authenticating the server 340. This public key can be selected based on the type of the computing device 310 (e.g., VCMD, smart plug, multimedia streaming device, etc.). Accordingly, the "N" server public keys and an indication of the particular server public key to use for the server authentication are loaded onto (directly or through the SDK or configuration file) and stored in the local memory of the computing device 310 prior to being provided to the user.

In the example of generating a device-to-user account association by the user (or a third party) and not the service provider, this association also includes a PIN. The PIN can be used in an additional layer of authentication. In this case, and prior to providing the computing device 310 to the user, the service provider can define the PIN (e.g., a randomly generated string of a particular length). This PIN is loaded onto (directly or through the SDK or configuration file) and stored in the local memory of the computing device 310 prior to being provided to the user.

After being provided to the user and in a power on state, the computing device 310 can determine that a data connection to a home data network has not been set-up yet (e.g., after the first time this device is powered on). Based on this determination, the computing device 310 determines the SSID from its local memory and establishes a data connection to the wireless router 320 by, for instance, using the SSID as the name of the hidden open network 330 and using a particular security protocol (e.g., WPA/WPA2 Personal).

Now that the computing device 310 joined the hidden open network 330, this computing device 310 can exchange data with the server 340 for authentication via the wireless router 320. In particular, the wireless router 320 sends outbound data from the computing device 310 to the server 340 and inbound data from the server 340 to the computing device 310. This and other data traffic is subject to the restrictions stored on the wireless router 320. Generally, the restrictions represent a firewall that constrains the data traffic to ensure that the hidden open network 330 is properly and securely used and minimize or prevent any impact to the home data network (that is also managed by the wireless router 320).

In an example, the restrictions limit the total number of computing devices on the hidden open network 330, the data throughput and time length of the data connection between the computing device 310 and the wireless router 320, the destination address of the outbound traffic from the computing device 310 (e.g., this destination address can be limited to the network address of the server 340), and/or the source address of inbound traffic (e.g., this source address can be limited to the network address of the server 340). Data traffic to and from the computing device 310 satisfying the restrictions is passed; otherwise, the data traffic is filtered out.

In an illustration, the restrictions allow the hidden open network 330 to access dynamic host configuration protocol (DHCP) on the router on port 67 with user datagram protocol (UDP), to access specific whitelisted IP addresses on port 443 with TCP. The restrictions can also deny computing devices on the home data network from communicating with computing devices on the hidden open network 330 and vice-versa. For the computing devices on the hidden open network 330, the restrictions can deny these computing devices from communication with each other and with internal router endpoints, and from accessing router settings interfaces. The restrictions can also give packets on the hidden open network 330 lower priority than the packets on the home data network. The restriction can also limit the maximum number of computing devices that can be connected to the hidden open network 330 at the same time to a particular number. When running out of client spots, the restrictions can necessitate disconnecting at least a predetermined number of the oldest computing devices provided these devices have been connected for more than a certain time amount. If they have been connected less than the certain time amount, the restrictions may specify that no action should be taken because these devices could be actively provisioning. The restrictions can also specify that disconnected computing devices should not be let back on the hidden open network 330 for at least a particular number of time. In addition, the restrictions can limit the maximum download/upload rate for the hidden open network 330 to a particular bit rate and the maximum data transfer to a particular amount of data a day.

Based on the restrictions, data is exchanged between the computing device and the server 340 via the wireless router 320 for authentication. The data exchanged can be carried over HTTP requests and responses. In an example, the computing device 310 sends its device digital certificate 312 to the server 340 and receives the server digital certificate 342 from the server 340. The two certificates 312 and 342 can be used in a mutual TLS authentication.

Upon completing a TLS authentication, HTTPS communications can be performed between the computing device 310 and the server 340. The server 340 can also retrieve the device public key 314 from the device digital certificate 312, look up user accounts or the public key-user account list, and determine a match (e.g., match the device public key 314 with the public key (or portion thereof) of the computing device 310 associated with the user's user account, or determine that the device public key 314 is on the public key-user account list). If the match exists, the server 340 determines that the computing device 310 is authenticated. If multiple matches exist (e.g., the device public key 314 is matched with two or more user accounts), the server 340 may reject the match (e.g., the computing device 310 is not authenticated) or may need additional authentication. In an example, the additional authentication involves the server 340 determining the most recent association between the public key 314 and a user account and authenticating the computing device 310 if it corresponds to this user account. In another example, the server 340 may send an authentication challenge and can authenticate the computing device 310 based on the response to this challenge. For instance, the authentication challenge may necessitate a user login to the user account via an application on a mobile device and a confirmation from the mobile device of a user possession of the computing device 310.

In response, the server 340 selects a private key from "N" private keys defined for and available to the server 340 (e.g., "N" server private keys) and generates a digital signature 346 by an HTTPS response with the server private key. Similar digital signatures may be generated and used in connections with HTTPS requests and responses from the server 340 to the computing device 310. The "N" server private keys correspond to the "N" server public keys stored in the memory of the computing device 310. The selected server private key corresponds to the server public key stored in the memory of the computing device 310 and indicated as usable in the authentication. Generally, the server 340 stores the "N" server private keys and a mapping of the "N" server private keys to types of computing devices. In an example, the mapping is also or alternatively specific to ranges of a product number of computing devices, where this mapping indicates that a particular server private key is applicable to a particular range of product numbers. Given the type of the computing device 310 (e.g., a VCMD, a smart plug, a multimedia streaming device, etc.) and/or the computing device's 310 product number, the server 340 determines from the mapping the particular server private key that should be used for the digital signature 346.

The computing device 310 receives the digital signature 346, determines the particular server public key and verifies the digital signature 346 with this key. If the digital signature 346 is verified, the computing device 310 determines that the server 340 is authenticated.

In the example of generating a device-to-user account association by the user (or a third party) and not the service provider, the PIN can be also used in an additional layer of authentication. In particular, once the computing device 310 authenticates the server 340 based on TLS and digital signature authentications, the computing device 310 can request and receive a nonce from the server 340. The computing device 310 uses the nonce to generate a hash of the PIN (shown as a PIN Hash 316) and sends the PIN hash 316 to the server 340. In response, the server 340 validates the PIN hash 316 to further authenticate the computing device 310.

As described herein above, multiple layers of authentications are possible (e.g., TLS, digital signature, association of device public key with user account, and PIN hash). Using any one of these authentication layers is possible. Using a combination or all of these authentication layers is also possible and provide added security.

Although FIG. 3 illustrates the use of the wireless router 320 to provide and manage access to the hidden open network 330, embodiments of the present disclosure are not limited as such. Instead, another computing device 322 can do so. In particular, the computing device 322 could have been previously obtained by the user and provisioned to access the user's secure home network. This computing device 322 can be of the same or different type as the computing device 310 (e.g., a VCMD, a smart plug, a multimedia streaming device, etc.). Upon the user obtaining the computing device 310 (that is to be provisioned) and upon the device-to-user association being generated for the computing device 310, the server 340 may send data to the computing device 322 indicating this association and instructions to perform provisioning functionalities. These instructions may trigger the computing device 322 to setup the hidden open network 322 for a predetermined time period (e.g., for a week after the association is generated) and impose restrictions on inbound and outbound traffic to and from the computing device 310.

Furthermore, FIG. 3 illustrates the data exchange as occurring, partially, over a hidden open network and by using HTTPS requests and responses. However, embodiments of the present disclosure are not limited as such. Instead, the computing device 310 may detect a nearby visible open network (e.g., a data network that broadcasts its SSID and does not require a passphrase) and the SSID of this network need not be pre-stored on the computing device 310. FIG. 3 illustrates such a network as an open network 350 managed by a wireless router 360. The computing device 310 and the server 340 can exchange the above data for authentication via the wireless router 360. In this case, the wireless router 360 may not store and apply the restrictions.

Figure 4:
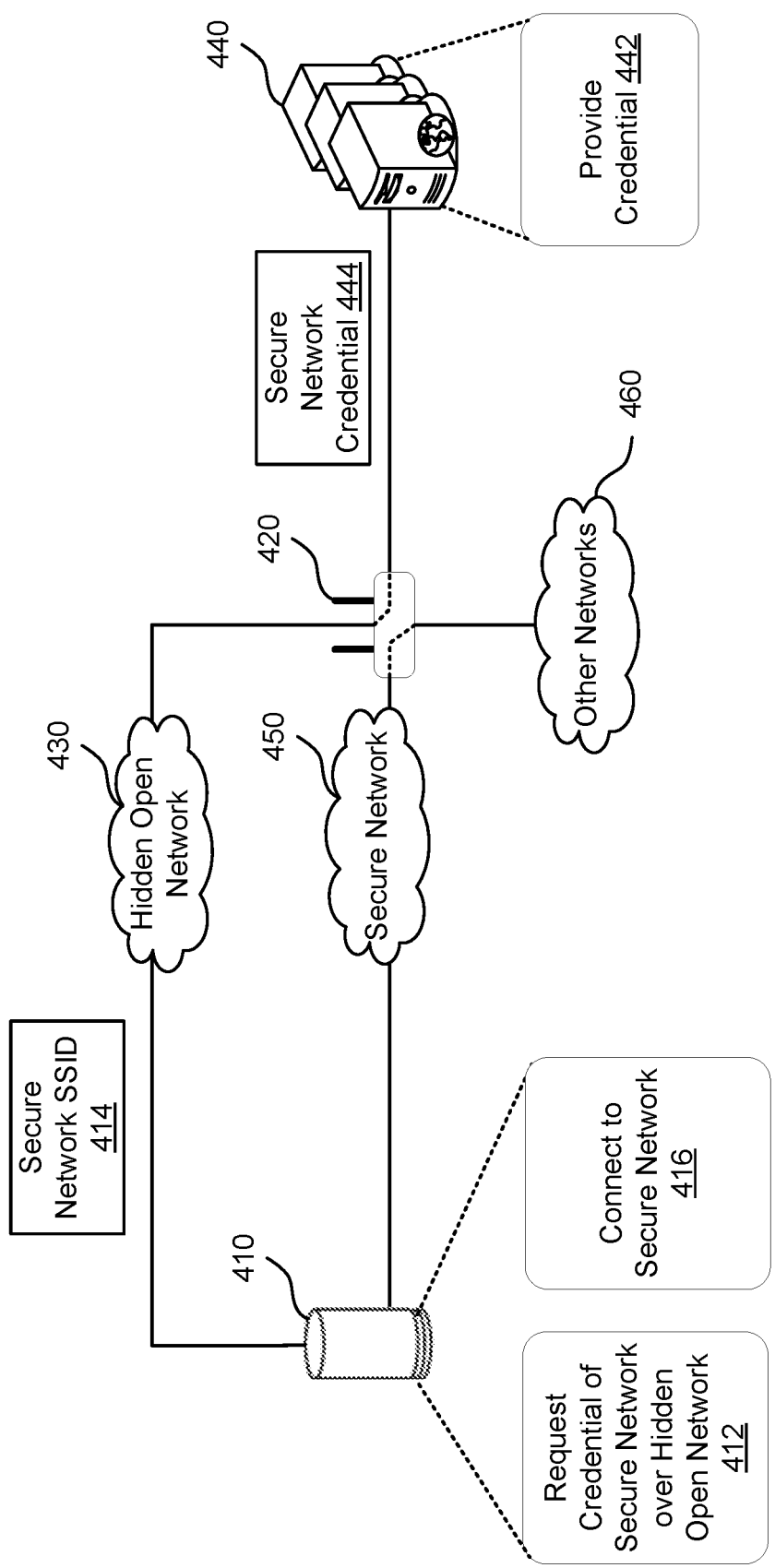
FIG. 4 illustrates an example of providing a credential of a secure data network from a server to a computing device, according to an embodiment of the present disclosure.

FIG. 4 illustrates an example of providing a credential of a secure data network from a server to a computing device, according to an embodiment of the present disclosure. In particular, the computing device and the server have exchanged data, partially, over an open data network (hidden or visible) and authenticated each other using the data. Next, the computing device and the server may continue exchanging data, partially over the open data network, where the data from the computing device identifies one or more secure LANs and the data from the server may include one or more credentials to some or all of these secure LANs. At that point, the computing device disconnects from the open data network and joins one of the secure LANs.

As illustrated, a computing device 410 is in data communications with a server 440 via a wireless router 420, where the computing device 410 has joined hidden open network 430 managed by the wireless router 420. The computing device 410, the wireless router 420, the hidden open network 430, and the server 440 are examples of the computing device 310, the wireless router 320, the hidden open network 330, and the server 340, respectively, of FIG. 3.

Once the authentication is complete, the computing device 410 can detect a nearby secure network 450 (e.g., nearby Wi-Fi LAN networks, each protected with a credential such as a passphrase). While still being on the hidden open network 430, the computing device 410 requests 412 that the server 440 provides the credential of the secure network 450. For instance, the computing device 410 sends an HTTPS request to the server 440 via the wireless router 420, where the wireless router 420 subjects this request to the restrictions. The HTTPS request includes an identifier of the secure network 450 (shown in FIG. 4 as a secure network SSID 414). In response, the server 440 can determine that the secure network 450 is already associated with a user account of the computing device 410 (e.g., the SSID of the secure network 450 is stored under the user account) and may retrieve the credential of the secure network 450 (e.g., the passphrase stored under the user account for the SSID). The server 440 then provides 442 the credential to the computing device via the wireless router 420, where the wireless router 420 also subjects this response to the restrictions. For instance, the server 440 sends an HTTPS response that includes the credential (e.g. shown as a secure network credential 444 in FIG. 4).

Once the computing device 410 receives the secure network credential 444, the computing device 410 disconnects from the wireless router 420, thereby leaving the hidden open network 430. The computing device 410 then reconnects to the wireless router 420 (or any other device that manages access to the secure network 450) by using the secure network SSID 414 as the name of the secure network 450, using the secure network credential 444 as a passphrase of the secure network 450, and using a particular security protocol (e.g., WPA/WPA2 Personal) to establish a new data connection, thereby joining the secure network 450. From that point on, the restrictions on the inbound and outbound data traffic would no longer be applicable and the computing device 410 can interact with computing devices and access computing services on other data networks 460, in addition to the server 112.

In the interest of clarity of explanation, FIG. 4 illustrates the computing device 410 detecting one secure network 450. However, the embodiments of the present disclosure are not limited as such and similarly apply when multiple secure networks are detected. In such a case, different techniques are possible to request the credentials of such networks.

In one example technique, the computing device 410 selects a particular secure network of the detected secure networks based on a set of factors. These factors include, for instance, signal strength and data throughput of the secure network. Thereafter, the computing device 410 can request the credential of this particular secure network from the server 440. If this network is already associated with the user account, the server 440 returns the credential and the computing device 410 joins the secure network. Otherwise, the server 440 can return a response indicating that the credential is unavailable (or may not return a response at all). In such a case (a negative response or lack of a response), the computing device can select a next secure network and repeat the request. This selection, request, and response process can be repeated until the computing device 410 successfully joins one of the secure networks or after attempting and failing to join all of these networks. In another example, the selection of a secure network can be random or can follow an alphabetical order of the names of the detected secure networks. In yet another example, the computing device 410 may send one HTTPS request or multiple HTTPS requests to identify the secure networks to the server 440, receive one HTTPS response or multiple HTTPS responses from the server 440 and then select (based on the factors, randomly, the alphabetical order, etc.) one of the secure networks to join.

Here also, and similarly to FIG. 3, the same wireless router 420 need not be used for both the hidden open network 430 and the secure network 450. Instead, a different wireless router and/or a computing device already provisioned and added to the secure network 450 can be used to provide and manage access to the hidden open network 430, whereas the wireless router 420 may be used to provide and manage access to the secure network 450.

Figure 5:
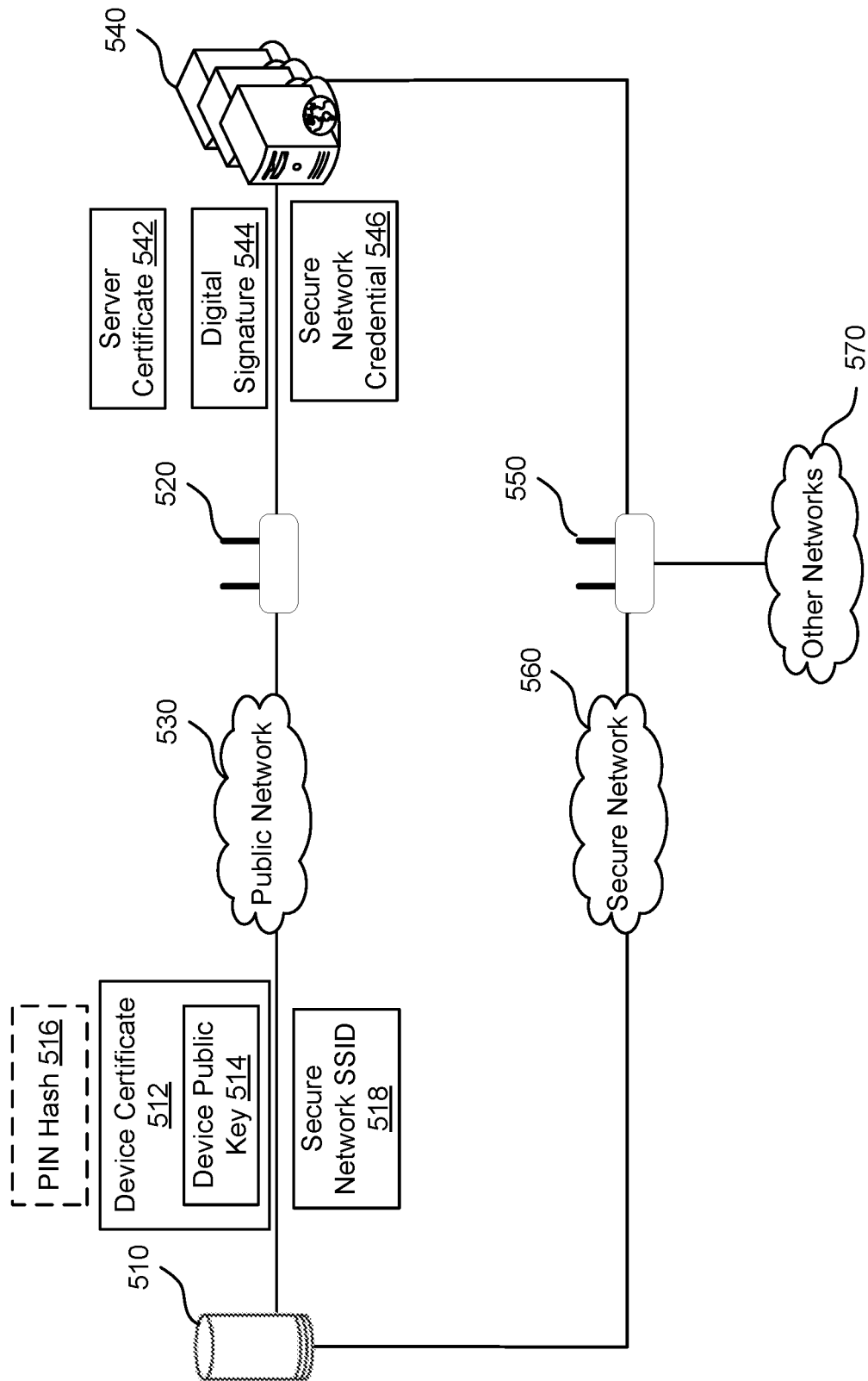
FIG. 5 illustrates another example of authenticating and providing a credential of a secure data network, according to an embodiment of the present disclosure.

FIG. 5 illustrates another example of authenticating and providing a credential of a secure data network, according to an embodiment of the present disclosure. In this example, rather than connecting to a wireless router on an open network (e.g., visible or hidden as in FIGS. 3 and 4), a computing device 510 can connect with a wireless router 520 on a public network 530 that has an active portal. The active portal may necessitate user input prior to establishing the connection (e.g., in an illustrative example, this provided network 530 may be provided by an entity such as a store or a hotel and may necessitate user input such as a customer loyalty number or a hotel room number and/or hotel guest name for access). In this case, DNS requests are used to pass the relevant authentication data and network data between the computing device and a server 540, without the computing device 510 joining the public network 530. Once authentication is complete and once the computing device 510 receives the credential of a secure network 560 from the server 540, the computing device 510 can connect to a wireless router 550 on the secure network 560 to then gain access to other data networks 570, in addition to the server 540.

Here, the computing device 510, the wireless routers 520 and 550, and the server 540 are examples of the computing device 410, the wireless router 420, and the server 440, respectively, of FIG. 4. One difference in comparison to FIG. 4 is that each piece of the authentication data and network data is pre-mapped to a domain (or sub-domain) having a particular domain name. The domain name can encode or represent that piece of data. Rather than exchanging the piece of data itself, the computing device 510 and the server 540 exchange a DNS request that is resolved to a domain name and, thereby, indicating the piece of data.

For example, the authentication data can include a device digital certificate 512, a device public key 514, a PIN hash 516, a server digital certificate 542, and a digital signature 544, similar to the device digital certificate 312, the device public key 314, the PIN hash 316, the server digital certificate 342, and the digital signature 346, respectively of FIG. 3. The network data can include a secure network SSID 518 and a secure network credential 546 similar to the secure network SSID 414 and the secure network credential 444, respectively, of FIG. 4. Each of the device public key 514, the PIN hash 516, the server digital certificate 542, the digital signature 544, the secure network SSID 518, and the secure network credential 546 can be mapped to a domain (or sub-domain) and indicated via a DNS request.

Figure 6:
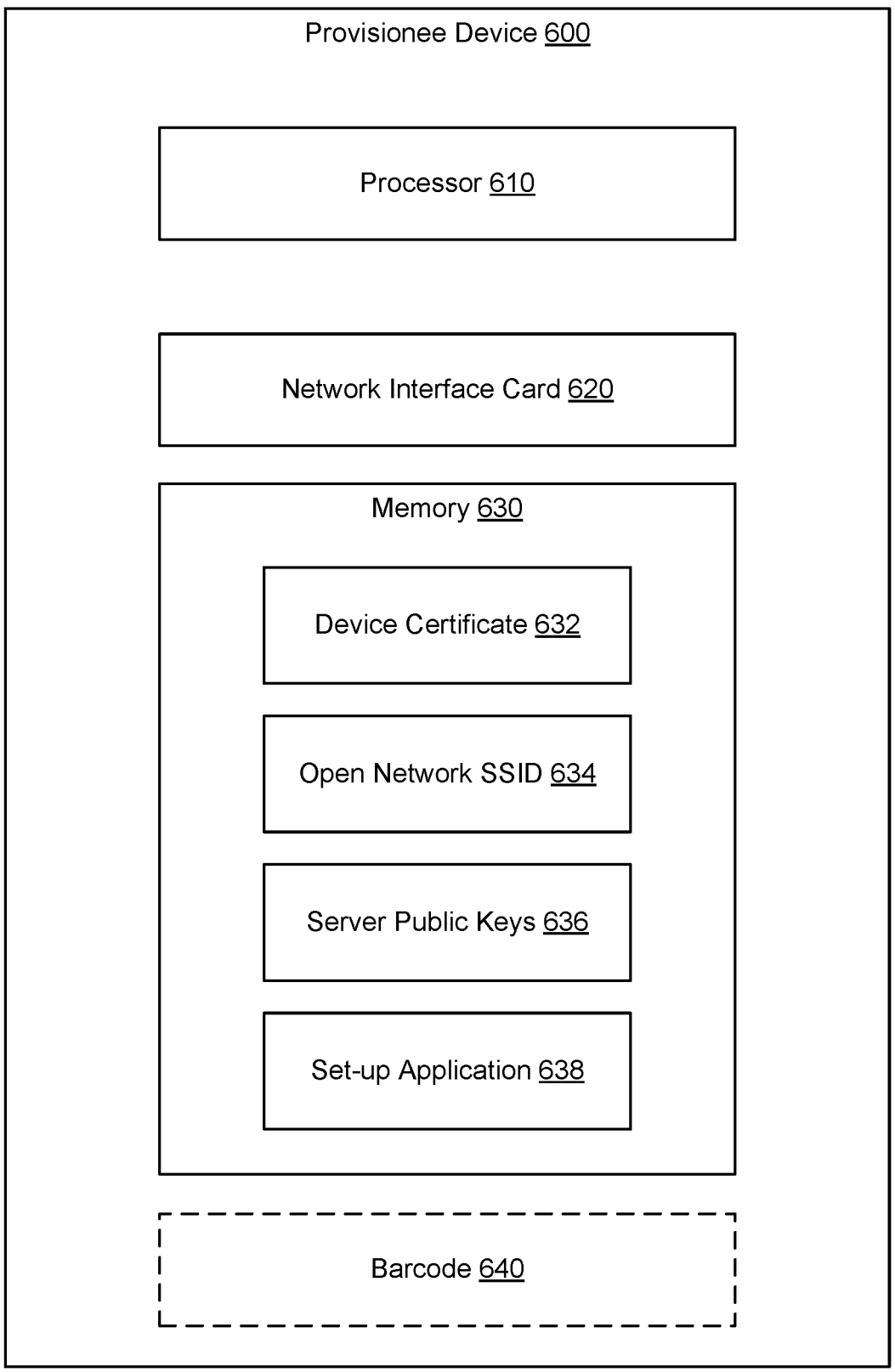
FIG. 6 illustrates an example of a computing device configured as a provisionee device to connect to a secure data network, according to an embodiment of the present disclosure.

FIG. 6 illustrates an example of a computing device configured as a provisionee device 600 to connect to a secure data network, according to an embodiment of the present disclosure. The provisionee device 600 represents a computing device that has not been configured yet to connect to a secure network and that is being provisioned via a server-based setup to automatically connect to the secure network. The computing device 142 of FIG. 1, the computing device 210 of FIG. 2, the computing device 310 of FIG. 3, the computing device 410 of FIG. 4, and the computing device 510 of FIG. 5 are examples of the provisionee device 600.

As illustrated, the provisionee device 600 includes a processor 610 (or multiple processors), a network interface card 620 (or multiple network interface cards), and a memory 630 (or multiple memories). In an example, a barcode 640 can also be attached to the provisionee device 600 (e.g., attached to a housing of the provisionee device 600).

The memory 630 stores a device digital certificate 632, open network SSID 634, "N" server public keys 636, and code for a set-up application 638. Upon execution of the code by the processor 610, the set-up application 638 is run and provides functionalities to join an open data network, perform an authentication, receive credential(s) of a secure data network(s), and join the secure data network. The set-up application 638 can also apply application-level restrictions to the inbound and outbound data traffic of the provisionee device over the open data network (e.g., by limiting any outbound traffic to a predefined address of a server). Such restrictions and the predefined address of the server can also be stored in the memory 630.

Figure 7:
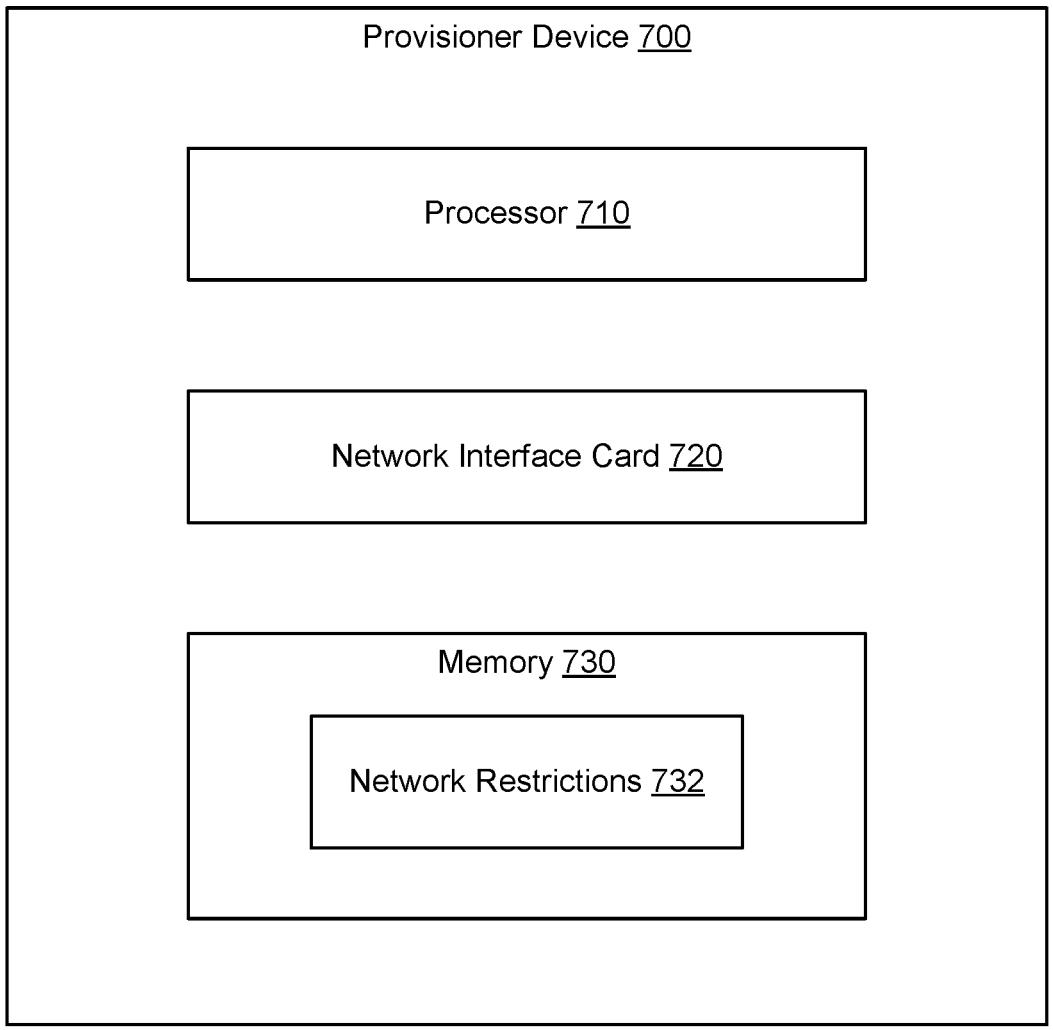
FIG. 7 illustrates an example of a computing device configured as a provisioner device to facilitate communications between a provisionee device and a cloud server, according to an embodiment of the present disclosure.

FIG. 7 illustrates an example of a computing device configured as a provisioner device 700 to facilitate communications between a provisionee device and a cloud server, according to an embodiment of the present disclosure. The provisioner device 700 represents a computing device that manages access to an open network and that can connect with a provisionee device and a server to support the provisioning of the provisionee device. The wireless router 146 of FIG. 1, the wireless routers 320 and 360 of FIG. 3, the wireless router 420 of FIG. 4, and the wireless router 520 of FIG. 5 are examples of the provisioner device 700. Other types of devices can also be used as provisioner device. For instance, a computing device that was previously a provisionee device and that was successfully provisioned to join a secure network can be configured as a provisioner device.

As illustrated, the provisioner device 700 includes a processor 710 (or multiple processors), a network interface card 720 (or multiple network interface cards), and a memory 730 (or multiple memories). The memory 730 stores network restrictions 732 to manage inbound and outbound traffic to and from a provisionee device on an open data network. The memory 730 can also include code for network application to manage the access to the open data network. In case the provisioner device 700 also manages access to a secure data network, the memory 730 can also include code for the same or another network application to manage this access.

Figure 8:
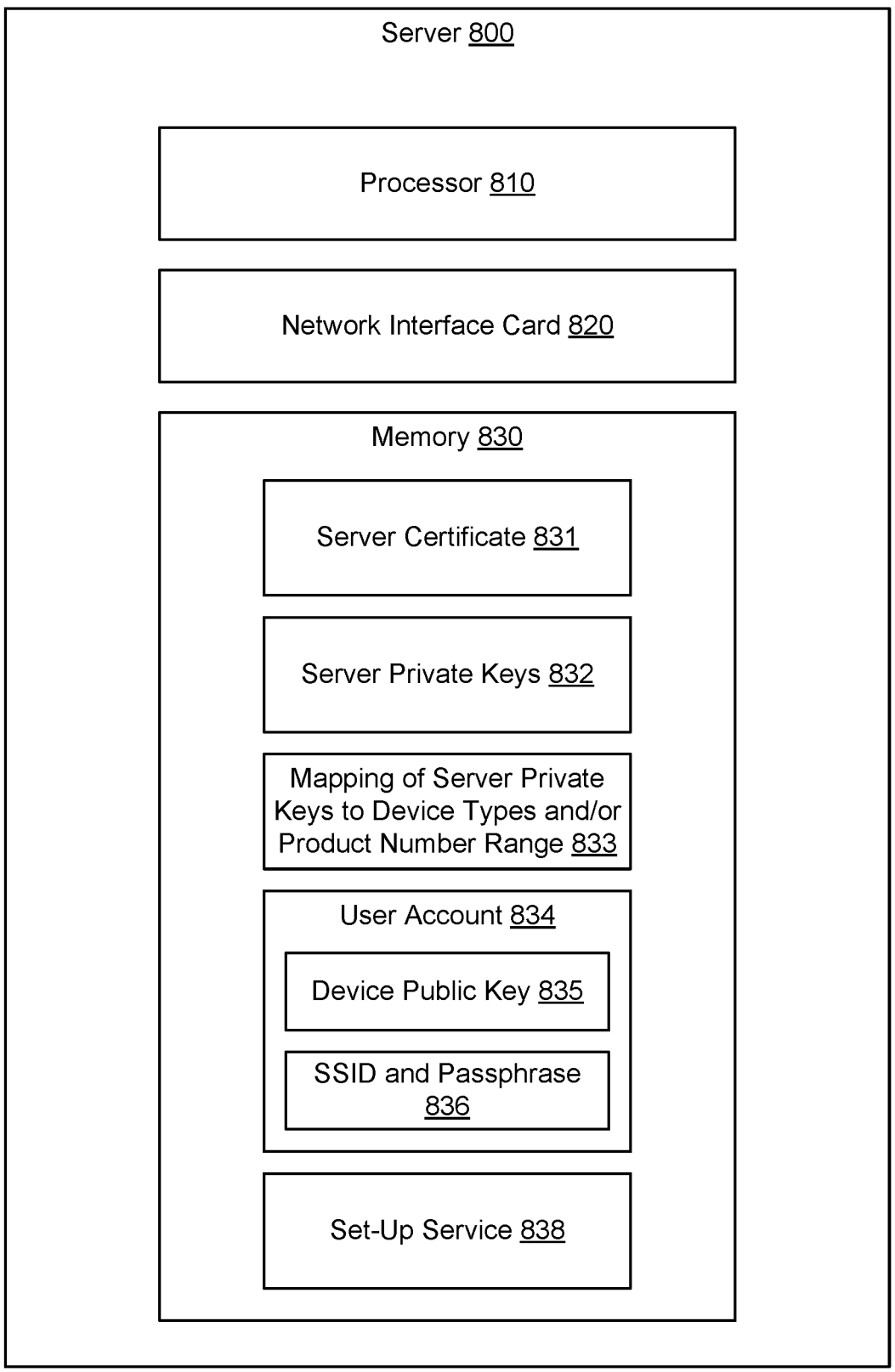
FIG. 8 illustrates an example of a cloud server configured to authenticate a provisionee device and provide a credential of a secure data network, according to an embodiment of the present disclosure.

FIG. 8 illustrates an example of a server 800 configured to authenticate a provisionee device and provide a credential of a secure data network, according to an embodiment of the present disclosure. The server 800 a specialized server hardware, a server-based software running on general purpose hardware, a cloud-based computing service hosted on hardware in a data center. Generally the server 800 represents a computing component of a backend system of a service provider, where this backend system may store user accounts for different users and provide computing services (e.g., multimedia streaming) to computing devices of the users based on the user accounts. The server 112 of FIG. 1, the server 250 of FIG. 2, the server 340 of FIG. 3, the server 440 of FIG. 4, and the server 540 of FIG. 5 are examples of the server 800.

As illustrated, the server 800 includes a processor 810 (or multiple processors), a network interface card 820 (or multiple network interface cards), and a memory 830 (or multiple memories).

The memory 830 stores a digital certificate of the server (shown as a server certificate 831). In addition, the server stores "N" private keys (shown as server private keys 832) and a mapping 833 of the server private keys 832 to device types. The mapping 833 associates each device type with a server private key. Additionally or alternatively, the mapping 833 associates each reach of computing device product numbers with a server public key. Generally, the digital server certificate 831 is used to authenticate the server 800 to a provisionee device. Depending on the type of the provisionee device (e.g., its product category) and/or the product number of the provisionee device (e.g., its serial number), the server 800 also selects one of the "N" private keys based on the mapping 833 and encrypts data with the selected server private key to generate a digital signature. The digital signature is used for further authenticating the server 800 to the provisionee device.

Furthermore, the memory 830 stores a user account 834 (or multiple user accounts for different users). Generally, the user account 834 stores data relevant to a user, to computing services available to the user, and to computing devices of the user including any provisionee device(s). In an example of data relevant to a provisionee device, the user account 834 stores a device public key 835 (or a portion thereof) of the provisionee device and, optionally, other data such as the provisionee device's product number and/or type. Such data represents an association between the provisionee device and the user account. In addition, the user account 834 stores an identifier and a credential (shown as an SSID and a passphrase 836) of a secure network accessible to the user (or multiple identifiers and credentials if multiple secure networks are accessible to the user). Once authentication is successfully performed, the server 800 can send the credential to the provisionee device. As explained herein above, in addition or alternative to storing the device public key 835 under the user account, a public key-user account list can be used. In particular, this list can be stored in the memory 830 and can associate the public key 835 with the user account 834 (and likewise, other public keys with the same user account 834 and/or other user accounts).

The memory 830 can also store code for a server-based setup service (shown as a set-up service 838). Upon execution of the code by the processor 810, the set-up service 838 is run and provides functionalities to authenticate the server 800 to a provisionee device, authenticate the provisionee device, and send the relevant credential(s) to the provisionee device.

Figure 9:
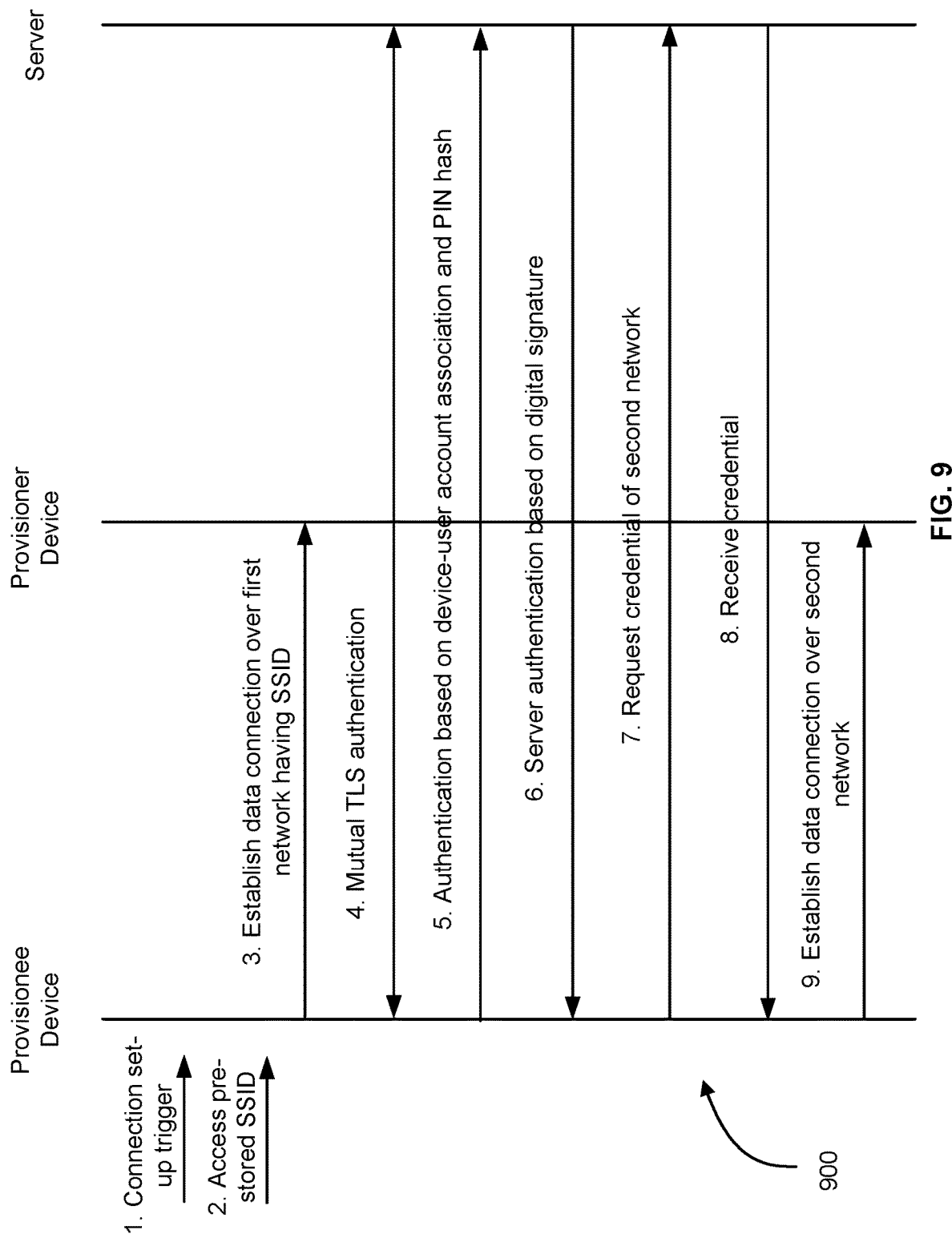
FIG. 9 illustrates an example of a sequence diagram between a provisionee device, a provisioner device, and a server to connect the provisionee device to a secure data network, according to an embodiment of the present disclosure.

FIG. 9 illustrates an example of a sequence diagram 900 between a provisionee device, a provisioner device, and a server to connect the provisionee device to a secure data network, according to an embodiment of the present disclosure. The provisionee device, the provisioner device, and the server are examples of the provisionee device 600 of FIG. 6, the provisioner device 700 of FIG. 7, and the server 800 of FIG. 8, respectively. Generally, the provisioner provides and manages access to an open data network. The provisionee device and the server exchange authentication data and network data, while the provisionee device is on the open network. Once the network data is received, the provisionee device disconnects from the open data network and joins a secure data network based on the credential of the secure data network from the network data. The secure data network need not be provided and managed by the provisioner device.

The sequence diagram 900 starts by the provisionee device (e.g., its set-up application) detecting a connection set-up trigger. This trigger causes the provisionee device to automatically start a server-based setup to receive the credential of the secure network and connect thereto. In an example, the trigger can be the first time the provisionee device is powered on. Another trigger can be a detection that no home network has been set-up for the provisionee device or that a previously set-up home network is no longer accessible or available. Yet another example can be a user input triggering the connection set-up, such as a hard button on the provisionee device or a soft button displayed on a screen of the provisionee device.

Next, the provisionee device accesses a pre-stored identifier of the open data network (e.g., this network's SSID) from its local memory. This can be the case when the open data network is hidden. However, if the open data network is visible, the device can receive its identifier via a broadcast from this network.

The provisionee device then establishes a data connection with the provisioner device to join the open data network. For example, the provisionee device uses the SSID as the name of the open data network and uses a particular security protocol (e.g., WPA/WPA2 Personal) to request access to this network from the provisioner device.

Once on the open data network, the provisionee device can communicate with the server via the provisioner device. The communications can includes HTTP requests and responses and can be subject to any restrictions stored by the provisioner device. The provisionee device and the server perform mutual TLS authentication. For instance, the provisionee device sends its device digital certificate to the server and the server sends its server digital certificate to the computing device for the TLS authentication. Once TLS authentication is performed, a secure communications channel can be established and the communications can include HTTPS requests and responses.

In addition to, independent of, or alternative to the TLS mutual authentication, the provisionee device and the server can also perform an authentication based on a device-user account association and an authentication based on a PIN hash by exchanging the relevant data via the provisioner device. In an example of the former authentication, the server can retrieve the device public key from the device digital certificate of the provisionee device and can compare this key to the device public key (or portion thereof) stored under the user account associated with the provisionee device or can look up a public key-user account list to find a match. If the comparison indicates a match, the server determines that the provisionee device is authenticated. In response, HTTPS data (e.g., data in each or some request and response) from the server are signed with a server private key, thereby creating a digital signature. The digital signature is received (e.g., in a corresponding HTTPS request or response) and verified by the provisionee device based on a server public key stored in the provisionee device's memory. In an example of the latter authentication, the provisionee device stores a PIN, and requests and receives a nonce from the server. The provisionee device then generates a PIN hash based on a hash of the PIN and nonce and sends the PIN hash to the server. The server verifies the PIN hash by hashing a PIN stored for the provisionee device under the user account.

Next, the provisionee device requests the credential of the secure data network, while still being on the open data network. For example, the provisionee device detects the identifier of the secure data network (e.g., its SSID) and sends an HTTPS request to the sever via the provisionee device. In response, the server looks up the user account, determines a match between the identifier and identifier(s) of secure data network(s) stored under the user account. Based on the match, the server retrieves, from the user account, the credential corresponding to the matched secure data network and sends this credential in an HTTPS response.

The provisionee device receives the credential. For instance, the HTTPS response is passed from the provisioner device to the provisionee device, while the provisionee device is still on the open data network.

Once the credential is received, the provisionee device establishes a new data connection with the provisioner device (or the relevant device on the secure data network) to join the secure data network. For instance, the provisionee device terminates the existing data connection, thereby leaving the open data network. The provisionee device also uses the SSID as the name of the secure data network and the credential as the passphrase, and uses a particular security protocol (e.g., WPA/WPA2 Personal) to request access to this network from the provisioner device.

Figure 10:
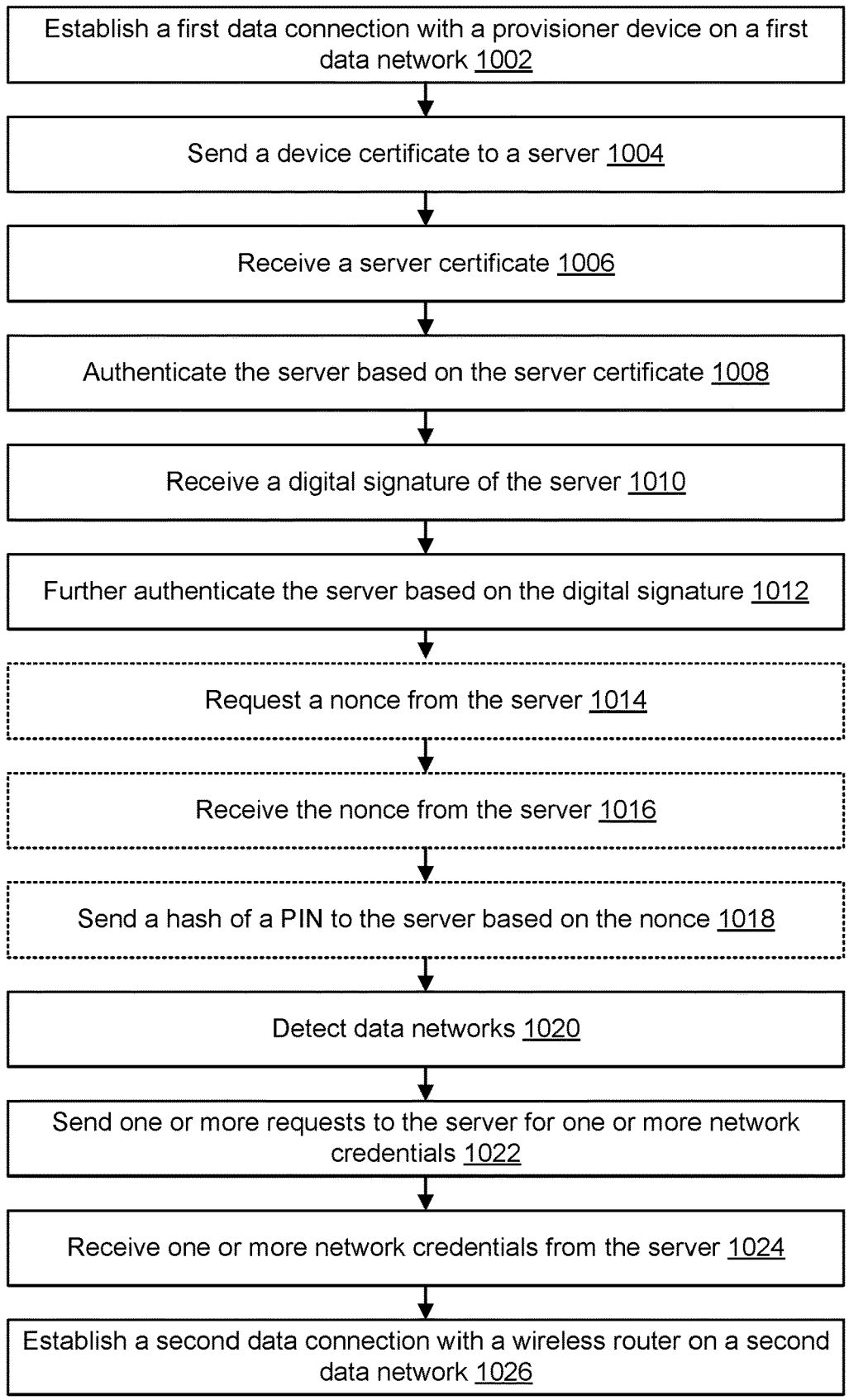
FIG. 10 illustrates an example of flow for connection of a provisionee device to a secure data network, according to an embodiment of the present disclosure.
Figure 11:
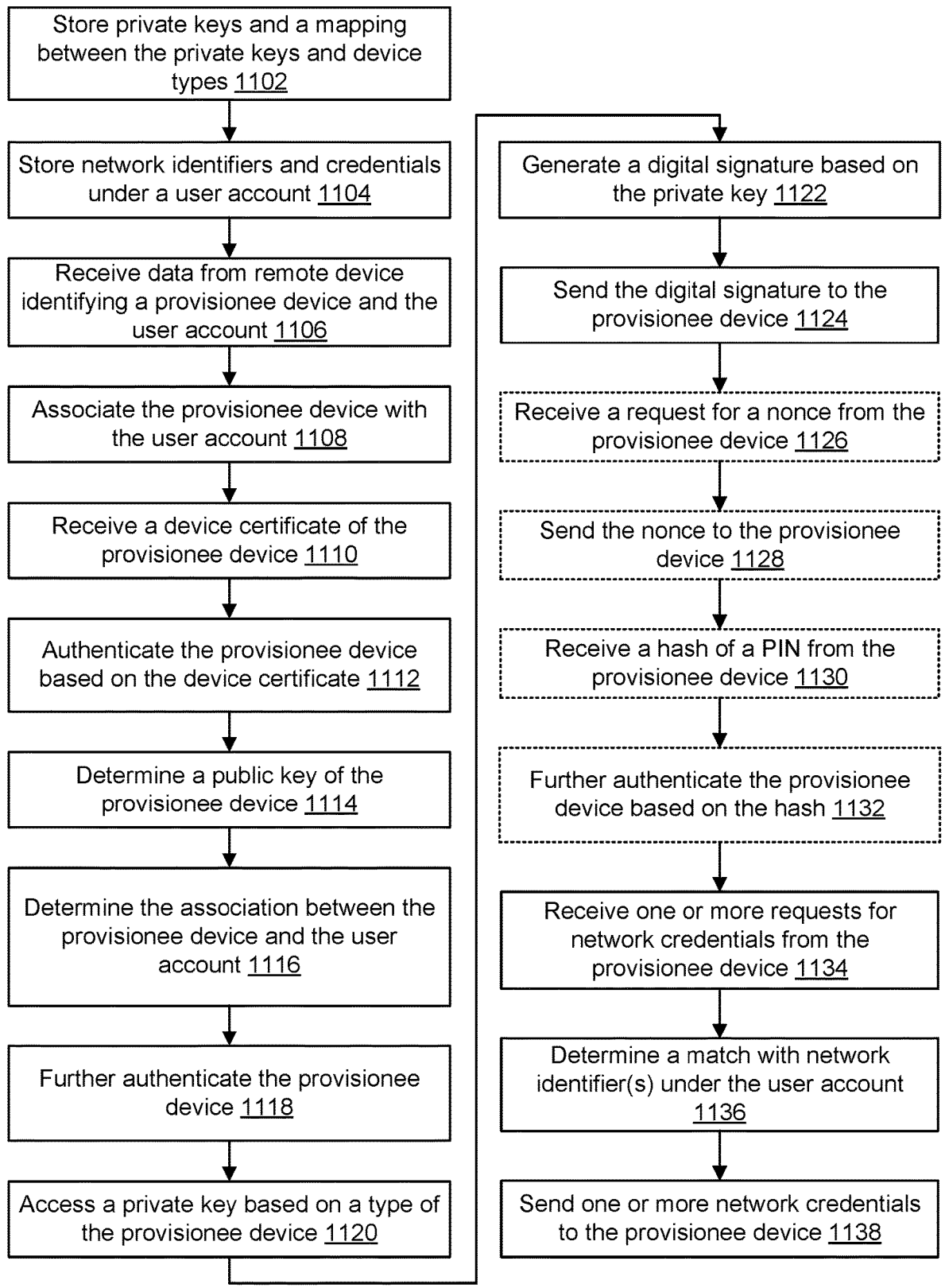
FIG. 11 illustrates an example of flow of a server providing a credential of a secure data network to a provisionee device, according to an embodiment of the present disclosure.

FIGS. 10-11 illustrate example flows for a server-based setup of a connection to a secure network. A provisionee device, similar to the provisionee device 600 of FIG. 6, is described as performing operations of the example flow of FIG. 10 and a server, similar to the server 800 of FIG. 8, is described as performing operations of the example flow of FIG. 11. Instructions for performing the operations can be stored as computer-readable instructions on one or more non-transitory computer-readable media of the relevant computing component (e.g., the provisionee device for FIG. 10 and the server for FIG. 11). As stored, the instructions represent programmable modules that include code or data executable by one or more processors of the relevant computing component. The execution of such instructions configures the relevant computing component to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

FIG. 10 illustrates an example of flow for connection of the provisionee device to a secure data network, according to an embodiment of the present disclosure. As illustrated, the example flow start at operation 1002, where the provisionee device establishes a first data connection with a provisioner device on a first data network. In an example, the first data network is a nearby Wi-Fi open data network that can be hidden or visible. If hidden, the provisionee device determines the SSID of this network from its local memory and requests access thereto from the provisioner device.

At operation 1004, the provisionee device sends a device digital certificate of the provisionee device to a server. In an example, the provisionee device accesses the device digital certificate from its local memory. Further, the provisionee device determines a network address of the server from its local memory too. The provisionee device generates an HTTP request destined to the network address and includes the device digital certificate. The HTTP request is sent from the provisionee device over the data connection with the provisioner device. Depending on applicable restrictions, the provisioner device routes the HTTP request to the server.

At operation 1006, the provisionee device receives a server digital certificate. In an example, this certificate is sent from the server in an HTTP response destined to the provisionee device. Depending on applicable restrictions, the provisioner device routes the HTTP response to the provisionee device.

At operation 1008, the provisionee device authenticates the server based on the server digital certificate. In an example, this authentication involves performing a TLS authentication by verifying the identity of the server and the certificate authority from the server digital certificate. Once TLS authentication is performed, HTTPS communications can occur between the provisionee device and the server via the provisioner device and subject to the restrictions.

At operation 1010, the provisionee device receives a digital signature of the server. In an example, HTTPS data (e.g., data in each HTTPS request, some of the HTTPS requests, each HTTPS response, or some of the HTTPS responses from the server) is signed with a server private key of the server. The signed HTTPS data is referred to herein as a digital signature. Generally, the server generates a one-way hash of the HTTPS data to be signed and encrypts the hash with the server private key. This resulting digital signature can be included in the corresponding HTTPS request or HTTPS response. The digital signature is sent from the server to the provisionee device (e.g., in the corresponding HTTPS request or response). Depending on applicable restrictions, the provisioner device routes the digital signature to the provisionee device. To illustrate, upon completion of the TLS authentication, the provisionee device sends an HTTPS request to the server (e.g., one including a random or specific message) and the server sends back an HTTPS response to this request. The HTTPS response is signed with the server private key and the HTTPS response is routed to the provisionee device. In this case, the server can generate a hash from the message included in the HTTPS request, and encrypts this hash with the server private key to generate the digital signature of the server. The digital signature is included in the HTTPS response. Further, and as described in connection with the next operations of the flow, HTTPS responses of the server, including those used to send a nonce and a credential, are signed with the server private key. Such signatures also represent digital signatures (e.g., a digital signature based on a hash of the nonce, a digital signature based on the credential) that can be verified by the provisionee device as another layer of server authentication.

At operation 1012, the provisionee device further authenticates the server based on the digital signature. In an example, the provisionee device accesses a public key of the server from its local memory and verifies the digital signature. Generally, the provisionee device decrypts the hash from the digital signature with the server public key, generates hash from the digital signature (or if the corresponding HTTPS request includes a message from the provisionee device, a hash of this message is generated), and compares the two hashes to determine a match. In an illustration, the local memory stores "N" server public keys. The local memory may also store an indication about one particular server public key of the "N" server public keys to use for the digital signature verification. The provisionee device selects this particular server public key based on the indication. In another illustration, no such indication is stored. Instead, the provisionee device selects a server public key and attempts to verify the digital signature with the selected public key. If successful, the digital signature is verified. If the decryption failed, the provisionee device selects a next server public key and attempts the verification, and so on and so forth until the digital signature is successfully verified or until all the "N" server public keys have been attempted. If the decryption failure persists, the server is not further authenticated by the provisionee device.

At operation 1014, the provisionee device requests a nonce from the server. In an example, the provisionee device stores a PIN usable to further authenticate itself to the server. For this further authentication, the provisionee device sends an HTTPS request for the nonce, where this request is destined to the server. Depending on applicable restrictions, the provisioner device routes the HTTPS request to the server.

At operation 1016, the provisionee device receives the nonce from the server. In an example, the nonce is sent from the server in an HTTPS response destined to the provisionee device. Depending on applicable restrictions, the provisioner device routes the HTTPS response to the provisionee device. As explained herein above, the nonce can be also signed with the server private key and the resulting digital signature can be included in the HTTPS response.

At operation 1018, the provisionee device sends a hash of the PIN to the server based on the nonce. In an example, the provisionee device hashes the PIN and the nonce and sends an HTTPS request that includes the hash. The HTTPS request is destined to the server and, depending on applicable restrictions, the provisioner device routes the HTTPS request to the server. Operations 1014-1018 are illustrated with dashed lines to indicate that these operations are applicable when a PIN is available. As described herein above, the PIN can be generated during the initial state of associating the provisionee device with the user account. Further, the hash may be sent only after a successful verification of the digital signature received under operation 1016 based on the server public key.

At operation 1020, the provisionee device detects one more data networks. In an example, the provisionee device detects nearby Wi-Fi secure LANs by identifying their SSIDs and determining that these data networks are secured.

At operation 1022, the provisionee device sends one or more requests to the server for one more network credentials. In an example, a single secure data network is detected. In this case, the provisionee device, while still being on the first data network, sends an HTTPS request that includes the SSID of this secure data network. The HTTPS request is destined to the server and, depending on applicable restrictions, the provisioner device routes the HTTPS request to the server. In another example, multiple secure data networks are detected. In this case, the provisionee device can select one of these data networks and sends the HTTPS request identifying the selected data network to the server. Alternatively, the provisionee device can send a single HTTPS request including the SSIDs of the detected secure data networks or a subset thereof. In yet another implementation, the provisionee device sends multiple HTTPS requests, each identifying one or more of the detected secure data networks.

At operation 1024, the provisionee device receives one or more credentials from the server. As in the example above about detecting a single secure data network, the server detects that this network should be accessible to the computing device based on an association between the identifier of this network and the user account. The server sends an HTTPS response that includes the credential. The HTTPS response is destined to the provisionee device and, depending on applicable restrictions, the provisioner device routes the HTTPS response to the provisionee device. If multiple secure data networks are identified to the server, the server similarly determines the subset of these networks that should be accessible to the computing device and sends their credentials in one or more HTTPS responses. As explained herein above, a credential included in an HTTPS response can be also signed with the server private key and the resulting digital signature can be included in the HTTPS response.

At operation 1026, the provisionee device establishes a second data connection with a wireless router on a second data network. In an example, the second data network is one of the detected secure networks for which a credential was received and the provisionee device establishes the second data connection to join this secure data network. The provisionee device terminates the first data connection, thereby leaving the first data network. The provisionee device also uses the SSID as the name of the secure data network and the credential as the passphrase, and uses a particular security protocol (e.g., WPA/WPA2 Personal) to request access to this network from the wireless router. Further, the second data connection may be established only after a successful verification of the digital signature received under operation 1024 based on the server public key.

In the case when multiple secure data networks are detected, the provisionee device can request their credentials at once (e.g., with one or more HTTPS requests) or can sequentially select a secure data network, request its credential, and if a credential is not received, select a next secure data network until receiving a credential or exhausting the list of detected secure data networks.

In addition, once the second data connection is established, the provisionee device can perform additional operations to determine whether the second data connection was set up based on communications with a trusted server and/or based on a server private key that has not been compromised. In an example, the provisionee device sends, to a second server, an indication of the server public key that it used to set-up the second data connection. This indication can be sent in an HTTPS request over the second data network, where the HTTPS request includes the server public key or at least a portion thereof. The second server may maintain a revocation list of public keys corresponding to private keys that have been compromised or that correspond to untrusted servers. Upon receiving the HTTPS request, the second server determines whether a match exists with one of the keys from the revocation list. A match indicates that the server public key used by the provisionee device is untrusted and should be revoked. If no match is found, this server public key can be trusted and is usable. The second server sends an indication to the provisionee device about whether the server public key is untrusted depending on the match. The indication can be sent in an HTTPS response that the provisionee device receives over the secure LAN. From the HTTPS response, the provisionee device determines whether the server public key is untrusted and should be revoked or is trusted and usable. In the former case, the provisionee device terminates the second data connection and, thus leaves, the second data network. In the latter case, the provisionee device does not terminate the second data connection and, thus, remains on the second data network. In addition, upon a determination that the server public key is untrusted and should be revoked, the second server may identify a second server public key that is trusted and that is already stored in the memory of the provisionee device. The identifier of this second server public key can be sent in the HTTPS response. Hence, upon leaving the second data network, the provisionee device can restart the process of connecting to a secure data network by relying on the second public key instead.

FIG. 11 illustrates an example of flow of the server providing the credential of the secure data network to the provisionee device, according to an embodiment of the present disclosure. In an example, the flow starts at operation 1102, where the server stores "N" server private keys and a mapping between the private keys and device types. The mapping indicates, for each type of provisionee device (e.g., product category), a particular server private key from the "N" server private keys to use for generating a digital signature.

At operation 1104, the server stores a network identifier(s) and a credential(s) under a user account. In an example, a computing device of the user is already provisioned and connects to a secure data network. As part of this provisioning, the identifier and the credential (e.g., SSID and passphrase) of the secure network are stored under the user's user account. If multiple secure data networks are accessible to this or other computing devices of the user, the corresponding identifiers and credentials are similarly stored under the user account.

At operation 1106, the server receives data from a remote device identifying the provisionee device and the user account. In an example, the remote device is a scanner of a service provider or a mobile device of the user. The data is sent from the remote device based on a scan of a barcode associated with the provisionee device (e.g., attached to a container of the provisionee device, printed on a sheet attached to the container, inserted in the container, or attached to the provisionee device). The data includes any or a combination of a device public key (or portion thereof) of the provisionee device, an identifier of the user account or user, a product number of the provisionee device, a product category of the provisionee device, and a PIN.

At operation 1108, the server associates the provisionee device with the user account based on the received data. In an example, the server determines the user account based on the identifier of the user account or user, and updates the user account to store the device public key (or portion thereof), the product number, the product category, and/or the PIN.

At operation 1110, the server receives a device digital certificate of the provisionee device. In an example, the provisionee device is on a first data network managed by a provisioner device. The provisionee device sends an HTTP request that includes the device digital certificate. This HTTP request is destined to the server and, depending on applicable restrictions, the provisioner device routes the HTTP request to the server.

At operation 1112, the server authenticates the provisionee device based on the device digital certificate and sends a server digital certificate of the server to the provisionee device. In an example, the authentication involves performing a TLS authentication by verifying the identity of the provisionee device and the certificate authority from the device digital certificate. For mutual TLS authentication, the server also generates an HTTP response destined to the provisionee device and including the server digital certificate. The HTTP response is sent to the provisionee device and, depending on applicable restrictions, the provisioner device routes the HTTPS response to the provisionee device. The provisionee device uses the server digital certificate to authenticate the server. Upon mutual TLS authentication, HTTPS communications can be performed between the server and the provisionee device.

At operation 1114, the server determines a device public key of the provisionee device. In an example, the server retrieves the device public key from the received device digital certificate.

At operation 1116, the server determines the association between the provisionee device and the user account based on the device digital certificate. In an example, the server uses the device public key from the device digital certificate to search and find the user account (e.g., by searching user accounts or searching a public key-user account list), thereby determining that the provisionee device has already been associated with the user account.

At operation 1118, the server further authenticates the provisionee device. In an example, the server uses the determination that the association between the provisionee device and the user account already exists as another layer of authenticating the provisionee device. In a further example, based on the match of the device public key from the device digital certificate and the device public key stored in the user account, the server declares that the provisionee device is further authenticated.

At operation 1120, the server accesses a server private key of the server based on a type of the provisionee device. In an example, the server determines the type of the provisionee device from data stored in the user account or from HTTPS data received from the provisionee device (whereby the provisionee device identifies its type to the server). The server uses the device type to look up the mapping and determines the server private key. In a further example, the product number of the provisionee device is also or alternatively used to the select the server private key. In particular, the mapping may further map provisionee device product number ranges with server private keys.

At operation 1122, the server generates a digital signature based on a server private key from the "N" private keys. In an example, the server receives an HTTPS request from the provisionee device including a message. The server prepares and sends an HTTPS response signed with the server private key. In an illustration, the server generates a hash of the message and encrypts the hash with the server private key, thereby generating a digital signature that can be included in the HTTPS response. Further, and as described in connection with the next operations of the flow, HTTPS requests and responses of the server, including those used to send a nonce and a credential, are signed with the server private key. Such signatures also represent digital signatures (e.g., a digital signature based on a hash of the nonce, a digital signature based on the credential) that can be verified by the provisionee device as another layer of server authentication.

At operation 1124, the server sends the digital signature to the provisionee device. In an example, the server sends an HTTPS response to the HTTPS request (as in the illustrative example under operation 1122), where this response is destined to the provisionee device and includes the digital signature. The HTTPS response is sent to the provisionee device and, depending on applicable restrictions, the provisioner device routes the HTTPS response to the provisionee device.

At operation 1126, the server receives a request for a nonce from the provisionee device. In an example, this request is sent from the provisionee device as an HTTPS request in response to an authentication of the server by the provisionee device. In an illustration, this authentication may include a verification by the provisionee device of the digital signature sent under operation 1124, where the verification relies on the server public key. The HTTPS request is destined to the server and, depending on applicable restrictions, the provisioner device routes the HTTPS request to the server.

At operation 1128, the server sends the nonce to the provisionee device. In an example, the server generates an HTTPS response that includes the nonce and destined to the provisionee device. In addition, a digital signature can be generated based on a hash on the nonce and the server private key and can be included in the HTTPS response. The HTTPS response is sent to the provisionee device and, depending on applicable restrictions, the provisioner device routes the HTTPS response to the server.

At operation 1130, the server receives a hash of a PIN from the provisionee device. In an example, this PIN hash is generated by the provisionee device based on the PIN and the nonce and is sent from the provisionee device in an HTTPS request to the server. This PIN hash may be received only after the provisionee device verifies the digital signature from operation 1128, as applicable, based on the server public key. The HTTPS request is destined to the server and, depending on applicable restrictions, the provisioner device routes the HTTPS request to the server.

At operation 1132, the server further authenticates the provisionee device based on the hash of the PIN. In an example, the server verifies the PIN hash by hashing a PIN stored for the provisionee device (e.g., under the user account) and comparing the hashes for a match.

At operation 1134, the server receives one or more requests for network credentials from the provisionee device. In an example, the server receives an HTTPS request originating from the provisionee device and routed by the provisioner device. The HTTPS request includes an identifier of a secure data network (e.g., an SSID of a secure Wi-Fi LAN). In a further example, the HTTPS request includes multiple identifiers, each for a different secure data network. In yet another example, the server receives multiple HTTPS requests, each identifying one or more secure data networks.

At operation 1136, the server determines a match with a network identifier(s) under the user account. In an example, the server retrieves an identifier of a secure data network from a received HTTPS request and uses this identifier to look up the user account and find a match. The server determines the credential from the user account of the matched secure data network. If multiple secure network identifiers are identified in or more HTTPS requests, the server performs a similar matching process to determine any additional matches and the corresponding credentials.

At operation 1138, the server sends one or more network credentials to the provisionee device. In an example, the server generates and sends an HTTPS response that includes the credential of a matched secure data network. The HTTPS response is destined to the provisionee device and, depending on applicable restrictions, the provisioner device routes the HTTPS response to the provisionee device. In case multiple secure data networks are matched, the same HTTPS response or multiple HTTPS responses may be sent to the provisionee device, each of which may include one or more of the corresponding credentials. Further, a credential included in an HTTPS response can be signed with the server private key and the resulting digital signature can be included in the HTTPS response for further authentication by the provisionee device.

Figure 12:
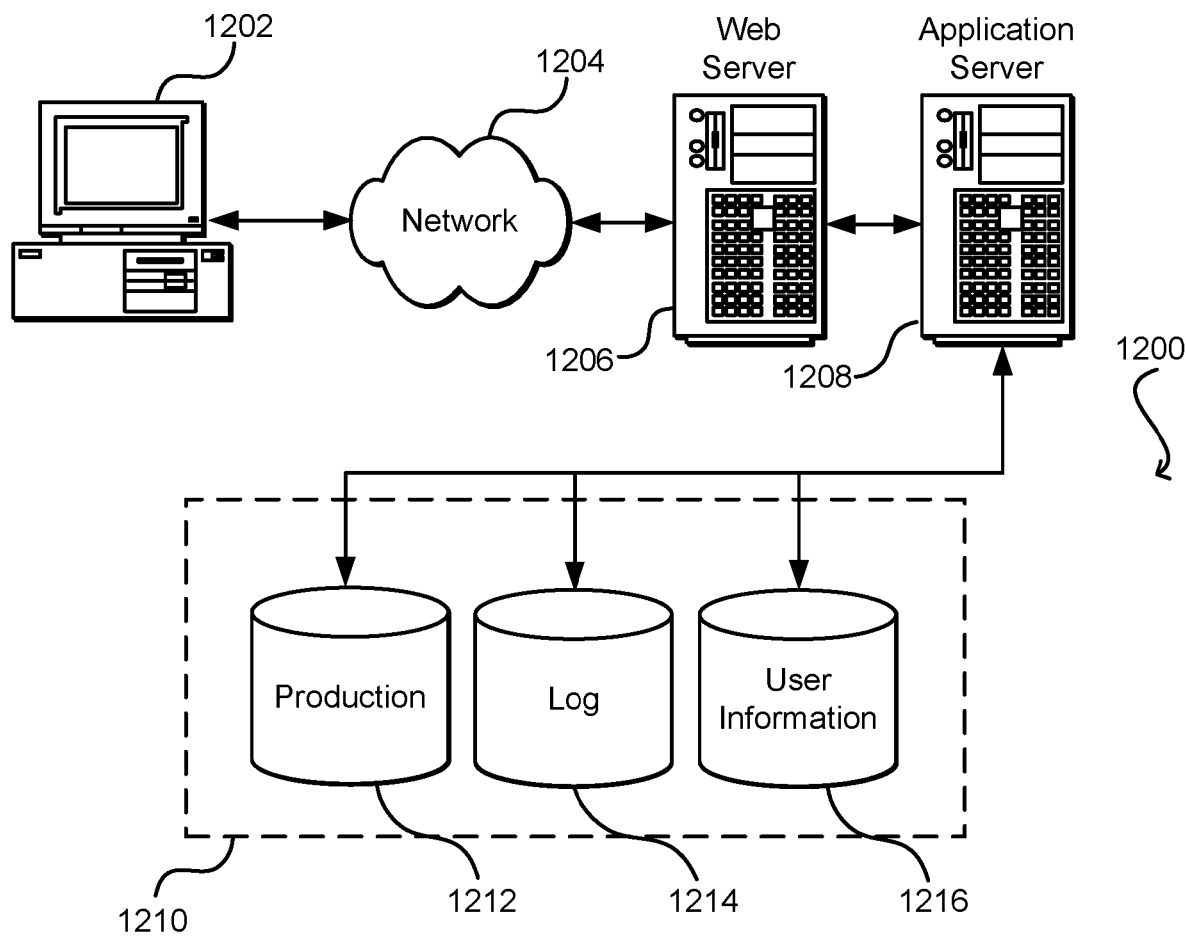
FIG. 12 illustrates a computer architecture diagram showing an example computer architecture, according to an embodiment of the present disclosure.

FIG. 12 illustrates a computer architecture diagram showing an example computer architecture, according to an embodiment of the present disclosure. This architecture may be used to implement some or all of the systems described herein. The computer architecture shown in FIG. 12 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 1200 includes a baseboard 1202, or "motherboard," which is a printed circuit board to which a multitude of components or devices may be connected by way of a system bus or other electrical communication paths. In one illustrative embodiment, one or more central processing units ("CPUs") 1204 operate in conjunction with a chipset 1206. The CPUs 1204 may be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a random access memory ("RAM") 1208, used as the main memory in the computer 1200. The chipset 1206 may further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM may also store other software components necessary for the operation of the computer 1200 in accordance with the embodiments described herein.

The computer 1200 may operate in a networked environment using logical connections to remote computing devices and computer systems through a network, such as the local area network 1220. The chipset 1206 may include functionality for providing network connectivity through a NIC 1212, such as a gigabit Ethernet adapter. The NIC 1212 is capable of connecting the computer 1200 to other computing devices over the network 1220. It should be appreciated that multiple NICs 1212 may be present in the computer 1200, connecting the computer to other types of networks and remote computer systems.

The computer 1200 may be connected to a mass storage device 1218 that provides non-volatile storage for the computer. The mass storage device 1218 may store system programs, application programs, other program modules, and data, which have been described in greater detail herein. The mass storage device 1218 may be connected to the computer 1200 through a storage controller 1214 connected to the chipset 1206. The mass storage device 1218 may consist of one or more physical storage units. The storage controller 1214 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 may store data on the mass storage device 1218 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1218 is characterized as primary or secondary storage, and the like.

For example, the computer 1200 may store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1218 by detecting the physical states or characteristics of one or more particular locations within the physical storage units.

In addition to the mass storage device 1218 described above, the computer 1200 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1200.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1218 may store an operating system 1230 utilized to control the operation of the computer 1200. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1218 may store other system or application programs and data utilized by the computer 1200. The mass storage device 1218 might also store other programs and data not specifically identified herein.

In one embodiment, the mass storage device 1218 or other computer-readable storage media is encoded with computer-executable instructions which, when loaded into the computer 1200, transforms the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various routines described above. The computer 1200 might also include computer-readable storage media for performing any of the other computer-implemented operations described herein.

The computer 1200 may also include one or more input/output controllers 1216 for receiving and processing input from a number of input devices, such as a keyboard, a mouse, a touchpad, a touch screen, an electronic stylus, or other type of input device. Similarly, the input/output controller 1216 may provide output to a display, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12. It should also be appreciated that many computers, such as the computer 1200, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method implemented by one or more servers to provide a passphrase of a secure local area network (LAN) to a computing device, access to the secure LAN provided by a wireless router, the method:

storing a list that associates one or more public keys with one or more user accounts;

storing a user account that comprises a user identifier, a service set identifier (SSID) of the secure LAN, and the passphrase of the secure LAN;

storing a private key of the one or more servers and a mapping between the private key and a product category of the computing device;

receiving, in response to a scan by a scanner of a barcode associated with the computing device, a public key of the computing device, the product category of the computing device, and the user identifier;

updating the list to comprise the public key and the user account;

receiving a certificate of the computing device via the wireless router, the certificate comprising the public key of the computing device, wherein the wireless router and the computing device are connected over an open LAN, and wherein the certificate is sent from the computing device over the open LAN;

authenticating the computing device by performing a transport layer security (TLS) authentication that uses the certificate;

determining, from the list, that the public key comprised in the certificate is associated with the user account;

accessing the private key of the one or more servers by determining from the mapping that the private key is associated with the product category of the computing device;

sending a first hypertext transfer protocol secure (HTTPS) response to a first HTTPS request of the computing device, the first HTTPS request sent from the computing device over the open LAN, the first HTTPS response signed with the private key of the one or more servers and sent from the one or more servers to the computing device over the open LAN via the wireless router;

receiving, from the wireless router, a second HTTPS request from the computing device, the second HTTPS request comprising the SSID of the secure LAN; and sending, to the computing device over the open LAN via the wireless router, the passphrase of the secure LAN from the user account in a second HTTPS response.

2. The method of claim 1, wherein the SSID and the passphrase are stored in the user account based on a data connection between a second computing device to the secure LAN via the wireless router, and wherein the second computing device is associated with the user account.

3. The method of claim 1, wherein the wireless router and the computing device are connected over the open LAN based on a predefined SSID of the open LAN stored on the computing device, wherein the first HTTPS request is received based on a first restriction that limits outbound traffic from the computing device over the open LAN to first traffic destined to the one or more servers, and wherein the first HTTPS response is sent based on a second restriction that limits inbound traffic to the computing device over the open LAN to second traffic originating from the one or more servers.

4. One or more non-transitory computer-readable storage media storing instructions that, upon execution by one or more processors of a system, cause the system to perform operations comprising:
  storing an association between a computing device and a user account, the user account associated with a local area network, the local area network associated with a network identifier;
  receiving a certificate of the computing device;
  determining the association between the computing device and the user account based at least in part on the certificate;
  authenticating the computing device based at least in part on the association being determined;
  sending, to the computing device based at least in part on the computing device being authenticated, data;
  receiving, after an authentication of the system by the computing device, a request of the computing device for a credential of the local area network, the authentication being based at least in part on the data, the credential being different from the network identifier; and
  sending the credential to the computing device based at least in part on the request.

5. The one or more non-transitory computer-readable storage media of claim 4, wherein each of the certificate and the request is received from the computing device via a data connection between the computing device and a wireless router of a second local area network that comprises the computing device and the wireless router, wherein each of the data and the credential is sent to the computing device via the data connection.

6. The one or more non-transitory computer-readable storage media of claim 4, wherein each of the certificate and the request is received via a data connection between the computing device and a second computing device over a second local area network, and wherein the operations additionally comprise:
  receiving barcode data associated with the computing device; and
  requesting, based at least in part on the barcode data being received, the second computing device to set-up the second local area network for a time period.

7. The one or more non-transitory computer-readable storage media of claim 4, wherein the operations further comprise:
  receiving, in response to a scan by a remote device of a barcode associated with the computing device, first data from the barcode about a public key of the computing device and second data about the user account, wherein the association between the computing device and the user account is generated based at least in part on the first data and the second data.

8. The one or more non-transitory computer-readable storage media of claim 4, wherein the operations further comprising:
  receiving, from a mobile device, barcode data from a barcode associated with the computing device, the barcode data comprising a personal identification number (PIN), wherein the association between the computing device and the user account comprises the PIN based at least in part on the barcode data.

9. The one or more non-transitory computer-readable storage media of claim 8, wherein the operations further comprise:
  receiving a hash of the PIN from the computing device, wherein authenticating the computing device is based at least in part on the certificate, the PIN associated with the computing device, and the hash of the PIN.

10. The one or more non-transitory computer-readable storage media of claim 4, wherein the operations further comprise:
  storing a plurality of private keys that comprise the private key;
  storing a mapping between the plurality of private keys and types of computing devices and ranges of product numbers of the types of computing devices; and
  signing the data with the private key based at least in part on a type of the computing device, a product number of the computing device, and the mapping.

11. The one or more non-transitory computer-readable storage media of claim 4, wherein the system is a back end server that stores credentials of local area networks, wherein the data comprises a message received in an HTTPS request from the computing device, and wherein the data is signed by generating a hash from the message and encrypting the hash with a private key of the system.

12. The one or more non-transitory computer-readable storage media of claim 4, wherein the operations further comprise:
  storing a mapping between a plurality of private keys of the system and computing device information, the computing device information comprising at least one of: types of computing devices or ranges of product numbers of the types of computing devices; and
  signing the data with a private key of the system based at least in part on information about the computing device and on the mapping.

13. The one or more non-transitory computer-readable storage media of claim 4, wherein the operations further comprise:
  determining a match between first data of the certificate and second data of the user account, wherein the association between the computing device and the user account is determined based at least in part on the match, and wherein the computing device is authenticated by at least determining that the computing device is already associated with the user account based at least in part on the association.

14. A computing device comprising:
  one or more processors; and
  one or more memories storing a certificate of the computing device and a public key of a server, the one or more memories further storing instructions that, upon execution by the one or more processors, cause the computing device to:
- establish a first data connection to a first local area network (LAN) associated with a network identifier;
- send the certificate to the server via the first data connection;
- receive data from the server via the first data connection, the data signed with a private key of the server based at least in part on the certificate;
- authenticate the server by verifying the data based at least in part on the public key of the server;
- request, after the server is authenticated, a credential of a second LAN from the server via the first data connection, the credential being different from the network identifier;
- receive the credential from the server via the first data connection; and
- establish a second data connection to the second LAN based at least in part on the credential.

15. The computing device of claim 14, wherein the execution of the instructions further causes the computing device to store a service set identifier (SSID) of the first LAN, wherein the first LAN is a hidden network, and wherein the first data connection is established based at least in part on the SSID from the one or more memories.

16. The computing device of claim 14, wherein data traffic from and to the computing device over the first LAN is restricted based at least in part one or more of: a throughput of the data traffic, a destination of the data traffic, an origin of the data traffic, or a number of computing devices connected to the first LAN.

17. The computing device of claim 14, wherein the execution of the instructions further causes the computing device to:
- detect identifiers of secure LANs comprising the second LAN;
- send a request to the server for credentials of the secure LANs; and
- receive one or more of the credentials from the server based at least in part on associations between one or more of the secure LANs and a user account, wherein the one or more of the credentials comprise the credential of the second LAN.

18. The computing device of claim 14, wherein the execution of the instructions further causes the computing device to:
- detect identifiers of secure LANs comprising the second LAN and a third LAN;
- send a request to the server for a credential of the third LAN;
- receive a response from the server that the credential of the third LAN is unavailable; and
- send a request to the server for the credential of the second LAN based at least in part on the response.

19. The computing device of claim 14, wherein the execution of the instructions further causes the computing device to store a plurality of public keys of the server and an indication to use the public key of the plurality of public keys to authenticate the server, wherein verifying the data is based at least in part on the indication.

20. The computing device of claim 14, wherein the execution of the instructions further causes the computing device to:
- send, to a second server over the second LAN, a first indication that the public key was used in association with establishing the second data connection;
- receive, from the second server, a second indication that the public key is untrusted; and
- terminate the second data connection to the second LAN based at least in part on the second indication.

* * * * *